(12) United States Patent
Koerner et al.

(10) Patent No.: US 8,605,289 B2
(45) Date of Patent: Dec. 10, 2013

(54) METHOD AND APPARATUS FOR INTERFEROMETRY

(75) Inventors: Klaus Koerner, Berlin (DE); Wolfgang Osten, Stuttgart (DE)

(73) Assignee: Universitaet Stuttgart (DE)

( * ) Notice: Subject to any disclaimer, the term of this patent is extended or adjusted under 35 U.S.C. 154(b) by 214 days.

(21) Appl. No.: 13/123,546

(22) PCT Filed: Oct. 12, 2009

(86) PCT No.: PCT/EP2009/007327
§ 371 (c)(1),
(2), (4) Date: May 10, 2011

(87) PCT Pub. No.: WO2010/040570
PCT Pub. Date: Apr. 15, 2010

(65) Prior Publication Data
US 2011/0235045 A1    Sep. 29, 2011

(30) Foreign Application Priority Data

Oct. 10, 2008    (DE) .......................... 10 2008 052 003
Oct. 14, 2008    (DE) .......................... 10 2008 052 814
Dec. 15, 2008    (DE) .......................... 10 2008 062 879

(51) Int. Cl.
*G01B 9/02* (2006.01)

(52) U.S. Cl.
USPC ........................................... 356/484

(58) Field of Classification Search
USPC .................... 356/484, 485, 489, 511, 516
See application file for complete search history.

(56) References Cited

U.S. PATENT DOCUMENTS

| 4,340,306 A | 7/1982 | Balasubramanian |
| 4,983,042 A * | 1/1991 | Korner et al. ................. 356/511 |

(Continued)

FOREIGN PATENT DOCUMENTS

| DE | 36 23 265 | 1/1988 |
| DE | 44 05 450 | 8/1995 |

(Continued)

OTHER PUBLICATIONS

Choi, S. et al. "Frequency-Comb-Based Interference Microscope with a Line-Type Image Sensor"—Japanese Journal of Applied Physics vol. 46, No. 10A, 2007, pp. 6842-6847, Oct. 9, 2007.

(Continued)

*Primary Examiner* — Michael A Lyons
(74) *Attorney, Agent, or Firm* — Gerald E. Hespos; Michael J. Porco; Matthew T. Hespos

(57) ABSTRACT

A method and an arrangement are provided for scalable confocal interferometry for distance measurement, for 3-D detection of an object, for Optical Coherence Tomography (OCT) tomography with an object imaging interferometer and at least one light source. The interferometer has an optical path difference not equal to zero at each optically detected object element. Thus, the maxima of a sinusoidal frequency wavelet, associated with each detected object element, each have a frequency difference $\Delta f\_Object$. At least one spectrally integrally detecting, rastered detector is arranged to record the object. The light source preferably has a frequency comb, and the frequency comb differences $\Delta f\_Source$ are changed in a predefined manner over time in a scan during measuring. In the process, the frequency differences $\Delta f\_Source$ are made equal to the frequency difference $\Delta f\_Object$ or equal to an integer multiple of the frequency differences $\Delta f\_Object$ at least once for each object element.

16 Claims, 10 Drawing Sheets

(56) References Cited

U.S. PATENT DOCUMENTS

| | | |
|---|---|---|
| 6,493,091 B2 * | 12/2002 | Kourogi et al. ............... 356/489 |
| 7,602,500 B2 * | 10/2009 | Izatt et al. .................... 356/497 |
| 7,787,132 B2 * | 8/2010 | Korner et al. ................. 356/601 |
| 2007/0002327 A1 | 1/2007 | Zhou et al. |
| 2008/0018906 A1 | 1/2008 | Kurokawa et al. |

FOREIGN PATENT DOCUMENTS

| | | |
|---|---|---|
| DE | 103 21 895 | 12/2003 |
| DE | 10 2005 023 212 | 11/2006 |
| GB | 2 355 210 | 4/2001 |

OTHER PUBLICATIONS

T. Bajraszewski et al. "Improved spectral optical coherence tomography using optical frequency comb"—Optics Express Mar. 17, 2008/vol. 16, No. 6, pp. 4163-4176.

* cited by examiner

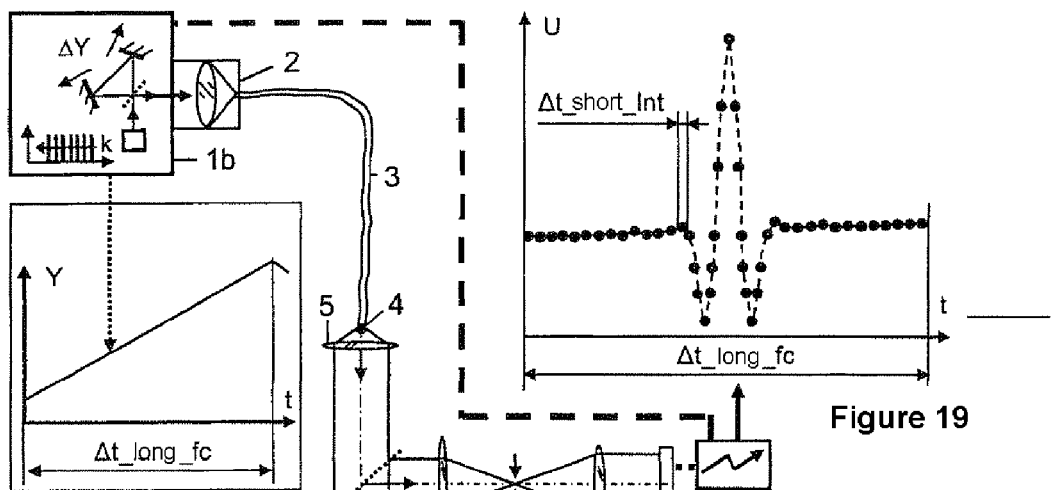
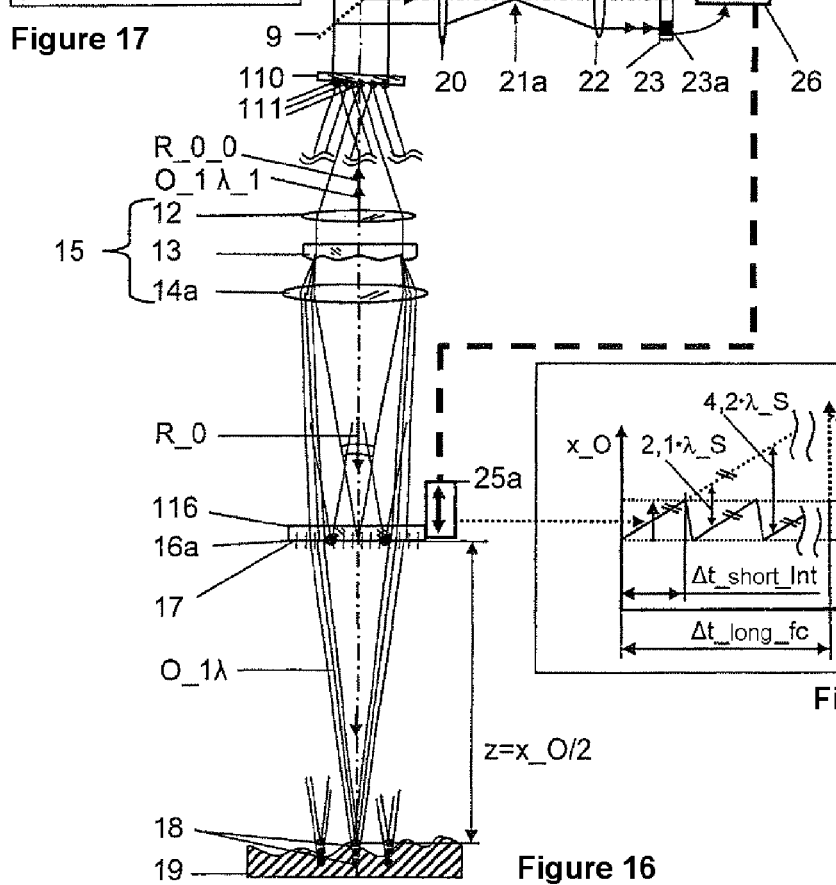
Figure 19
Figure 17
Figure 18
Figure 16

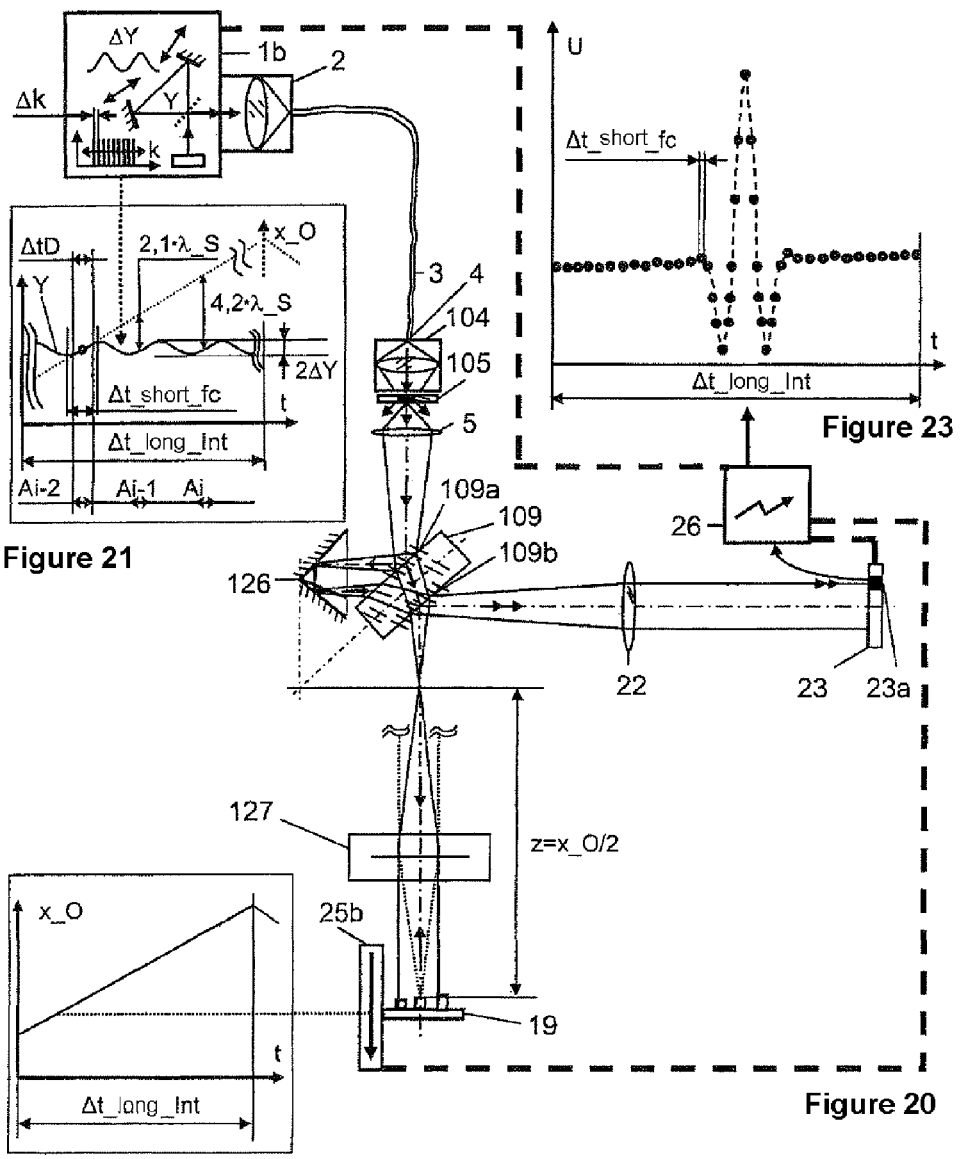

METHOD AND APPARATUS FOR INTERFEROMETRY

BACKGROUND OF THE INVENTION

1. Field of the Invention

The invention relates to a method and to an arrangement for scalable confocal interferometry for distance measurement, for 3-D detection of an object, for OC tomography with an object imaging interferometer and at least one light source.

2. Description of the Related Art

The sequential recording of data from different depths of the object space by focusing through plays a functionally important role, as is known, for microscopic white-light interferometry. Reference to this can be found in the following documents:

[1] Balasubramanian N: Optical system for surface topography measurement. U.S. Pat. No. 4,340,306 (1982),
[2] Kino G S, Chim S: Mirau correlation microscope. Appl. Opt. 29 (1990) 3775-3783,
[3] Byron S L, Timothy C S: Profilometry with a coherence scanning microscope. Appl. Opt. 29 (1990) 3784-3788,
[4] Dresel T h, Häusler G, Venzke H: Three-dimensional sensing of rough surfaces by coherence radar. Appl. Opt. 31 (1992) 919-925,
[5] Deck L, de Groot P: High-speed noncontact profiler based on scanning white-light interferometry. Appl. Opt. 33 (1994) 7334-7338,
[6] Windecker R, Haible P, Tiziani H J: Fast coherence scanning interferometry for measuring smooth, rough and spherical surfaces. J. Opt. Soc. Am 42 (1995) 2059-2069.

Approaches [2], [3], [5], [6] relating to white-light interferometry, which is often also referred to as short-coherence interferometry, are in general in fact restricted to the microscopic range. These approaches cannot be scaled to a major extent in terms of resolution capability and depth measurement range in the direction of coarser scales since these methods are in general very closely linked to the magnitude of the light wavelength that is used. Short-coherence interferometry in the infrared spectral range generally leads to a multiplicity of technical problems and to high costs.

In addition, the approaches [1], [2], [3], [4], [5] and [6] as well as the approach by G. Häusler, described in DE 10 2005 023 212 B4 [7], can be miniaturized in a measurement arrangement or sensor arrangement only to a limited extent since, in this case, the object arm or the reference arm of the interferometer must be constructed with moving components since, according to the method, the optical path-length difference must be varied in one of the two arms. This necessitates a certain physical volume for the means for moving components in one of these arms. The use of the approach [7] requires means for varying the optical path length both in the reference arm and in the object arm. In many cases, for example for use in an endoscope, this can be achieved only with a comparatively high level of technical complexity, and with comparatively high costs.

White-light interferometry sensors based on the approaches described in [1]-[7] also in general do not allow measurements, for arrangements in which the volume must be greatly minimized, on objects with distances between the object and the sensor in the region of one or more meters, since during the measurement, the optical path length in the reference arm must at least once be made equal to the optical path length in the object arm. Even with folded arrangements, this generally leads to the sensor having a considerable physical volume.

The publication by T. Bajraszewski et al. "Improved spectral optical coherence tomography using optical frequency comb" [8] in Optics Express 17 Mar. 2008/Vol. 16, No. 6, pages 4163 to 4176 describes an OCT arrangement (OCT=Optical Coherent Tomography) having a frequency comb laser for the eye patient, in which the OCT arrangement includes a tunable Fabry-Perot interferometer in a frequency comb laser arrangement, and a spectrometer. The aim in this case is to improve the depth resolution of the OCT. A rapid single-shot measurement over an area is feasible only with a very high level of technical complexity, since an object is detected laterally in a serial form.

The document U.S. Pat. No. 7,391,520 B2 [9] discloses an OCT approach using a detector with a multiplicity of spectral channels, that is to say a spectrometer. The necessity to use a spectrometer in the optical measurement system in each case here means, however, that an object cannot be recorded over an area or as an image at one time, but in general can be recorded only point-by-point; the detection of an object over an area must therefore be carried out laterally and in a serial form. This is undoubtedly also acceptable for the applications described in [8] and [9]. Furthermore, however, these approaches do not allow application to the measurement of macroscopic objects, but are restricted for financial reasons to the measurement of comparatively small objects. In fact, it is not even possible to measure objects with a large depth extent and a long distance, using approaches such as these.

The publication by Choi, S.; Shioda, T.; Tanaka, Y.; Kurokawa, T.: Frequency-Comb-Based Interference Microscope with a Line-Type Image Sensor, Japanese Journal of Applied Physics Vol. 46, No. 10A, 2007, pages 6842-6847 [10] describes an interference microscope with a frequency comb laser in which the frequency intervals are tuned. However, this approach cannot be used to completely measure an object with a comparatively great depth extent if the aim is to use a comparatively large numerical aperture for object imaging, in order to achieve high lateral resolution. Furthermore, if this approach is to be used for rapid measurement of an object with a comparatively large depth extent, it is absolutely essential to use either a high-speed camera or a short-pulse frequency comb laser source, or a rapid shadowing apparatus since, when the frequency intervals of the frequency comb laser are tuned through rapidly as is then required this also results in a high phase angle rate in the interference phenomenon to be scanned at the output of the interferometer. These means are either complex and costly or, in the end, lead to signals with a rather poor signal-to-noise ratio for detection of the interference phenomenon.

Known approaches using a second scanning two-beam interferometer associated with the object two-beam interferometer, as described in document GB 2355210 A by K. Ehrmann, produce interference signals with a reduced contrast, which can exacerbate signal evaluation. Furthermore, in this case, it is actually not possible to scale the measurement method for a large depth measurement range.

The document DD 240824 A3 by J. Schwider in 1972 described the use of a Fabry-Perot etalon in reflection, as an adjustment aid in a spectral white-light two-beam interferometer. In 1994, in the document DE 44 05 450 A1, J. Schwider likewise described the use of a very thin Fabry-Perot resonator in the beam path of a spectral white-light two-beam interferometer in order to still obtain interferograms that can be evaluated even for relatively long distances between an object and a reference surface in a Fizeau interferometer. This related to the visualization of interference. In this case, it is impossible to record objects using confocal filtering. In this case, the measurement method cannot be scaled for a large depth measurement range.

Furthermore, FIG. 7 in laid-open specification DE 3623265 A1 illustrates a Fabry-Perot interferometer for position measurement of a mirror in conjunction with a second interferometer for producing a spatially broadened interferogram. An arrangement such as this can be used to scan extended mirrors, but not small objects, since, in fact, sharp imaging of small objects using a multi-beam interferometer is in fact possible only to a very restricted extent.

The object of the present invention is to provide interferometry which can be adapted over a wide scale, with high measurement and scanning accuracy and with the measurement being highly robust.

SUMMARY OF THE INVENTION

One aspect of the invention therefore provides a method for interferometry, which comprises:

production of an electromagnetic measurement signal (also referred to in the following text as "light");

splitting or division of the measurement signal into a scanning beam component and a reference beam component (in the form of a two-beam interferometer);

illumination of at least one object point with at least a portion of the scanning beam component;

production of an interference signal by superimposition of a portion of the scanning beam component that has been reflected from the at least one reference object and the reference beam component, wherein that portion of the scanning beam component in the interference signal which has been reflected from the at least one object point has an optical path-length difference $x\_O$, which depends on the position of the object point and is in particular other than zero, relative to the reference beam component, wherein the measurement signal is produced with a frequency comb spectrum with the same frequency comb intervals $\Delta f\_Signal$ of the individual frequency components, and/or wherein the interference signal is conditioned or filtered by means of a frequency comb filter such that the filtered interference signal now has only a frequency comb spectrum with the same frequency comb intervals $\Delta f\_Signal$ of the individual frequency components; and wherein the method furthermore comprises:

variation of the frequency comb intervals $\Delta f\_Signal$ in the frequency comb spectrum of the measurement signal or of the filtered interference signal and/or variation of the optical path-length difference $x\_O$ over time such that the frequency comb intervals $\Delta f\_Signal$ correspond at least at times to an integer multiple of the quotient $c/x\_O$ of the speed of light $c$ and the optical path-length difference $x\_O$; and detection of an intensity and/or of an intensity change in the interference signal for a multiplicity of frequency comb intervals $\Delta f\_Signal$ and/or for a multiplicity of optical path-length differences $x\_O$.

The detection of values of the intensity and/or intensity change of the interference signal for a multiplicity of frequency comb intervals $\Delta f\_Signal$ and/or for a multiplicity of optical path-length differences $x\_O$ is therefore used in particular to determine a signal profile of the interference signal as a function of the varied or varying frequency comb intervals and as a function of the optical path-length difference.

An electromagnetic measurement signal having a frequency comb spectrum is therefore particularly preferably produced, such that the frequency comb intervals $\Delta f\_Signal$ of the measurement signal (also referred to in the following text as $\Delta f\_Source$) are varied over time in a modulation interval $[\Delta f\_Signal\_min; \Delta f\_Signal\_max]$ (also referred to in the following text as $[\Delta f\_Source\_min; \Delta f\_Source\_max]$) of the frequency comb intervals. This variation over time can be carried out in various ways, as will be described using a number of examples in the following text as well. In the normal manner, the term frequency comb spectrum means a spectrum which comprises a multiplicity of equidistant frequency components plotted against the frequency, with the intervals between adjacent frequency components in the frequency domain being referred to as the frequency comb intervals $\Delta f\_Signal$. In this case, the frequency components need not necessarily all occur with the same intensity. The intensity of the discrete frequency components with respect to one another is preferably distributed according to or in a similar manner to a Gaussian curve, with the intensities of the frequency components falling toward higher and lower frequencies, starting from a central frequency.

In particular, one aspect of the invention has identified that, if a frequency comb spectrum is in each case mistuned in the signal path (for example in the measurement signal and/or in the interference signal) and in the optical path-length differences $x\_O$ of the two beam paths in the two-beam interferometer, this makes it possible to modulate an intensity and/or an intensity change of the interference signal in a manner which can be detected easily. In particular, when the frequency comb intervals $\Delta f\_Source$ are varied or scanned relative to the optical path-length difference $x\_O$, this then results in a resonance in the interference signal when the frequency comb intervals $\Delta f\_Source$ correspond to a frequency comb resonance interval $\Delta f\_Source\_Res$ which corresponds to an integer multiple of the frequency interval $\Delta f\_Object=c/x\_O$ from the quotient between the speed of light $c$ and the optical path-length difference $x\_O$, that is to say $\Delta f\_Source=n\cdot c/x\_O$ where $n=1, 2, 3, \ldots$. For the purposes of the invention, the correspondence between the frequency comb intervals $\Delta f\_Source$ and the frequency interval $\Delta f\_Object=c/x\_O$ from the quotient between the speed of light $c$ and the optical path-length difference $x\_O$, that is to say $\Delta f\_Source=c/x\_O$, should also be understood to be an integer multiple (where $n=1$).

In the region of resonance, that is to say around this resonance condition, in particular within the modulation interval ($[\Delta f\_Source\_min<\Delta f\_Source\_Res;$ $\Delta f\_Source\_max>\Delta f\_Source\_Res]$) of the frequency comb intervals, particularly strong modulation of the intensity of the interference signal is observed when the frequency comb intervals $\Delta f\_Source$ are varied relative to the optical path-length difference $x\_O$. This modulation can be detected very easily and with high accuracy by means of a simple detector element. For this purpose, the intensity or the intensity change is preferably detected for a multiplicity of frequency comb intervals $\Delta f\_Source$ within the modulation interval around the at least one frequency comb resonance interval $\Delta f\_Source\_Res$. In another preferred embodiment, the intensity or intensity change is preferably detected for a multiplicity of different optical path-length differences $x\_O$ around at least one resonance condition.

A frequency comb modulation interval $\Delta f\_Source\_Mod$ is preferably determined from the detected values of the interference signal, in particular the intensity and/or intensity change, in particular as a frequency comb interval for the maximum modulation of the detected signal profile of the interference signal, and/or as the frequency comb interval for the signal maximum in the detected signal profile of the interference signal, and/or as the frequency comb interval at the signal centroid of the detected signal profile in the interference signal. The determined frequency comb modulation interval Δf_Source_Mod is preferably stored and/or evaluated. The frequency comb modulation interval Δf_Source_Mod determined in this way preferably corresponds to a good approximation to the frequency comb resonance interval Δf_Source_Res. Information relating to the fundamental optical path-length difference x_O, and therefore an absolute and/or relative position of the at least one object point, can therefore preferably be determined from the determined frequency comb modulation interval Δf_Source_Mod.

In particular, when using an interferometry method according to the present invention, there is no need for complex detection by means of a spectrometer. In fact a spectrally integrating detector element, at least in spectral subranges, is preferably used. In particular, this can be produced more easily and better than high-resolution spectrometers, while on the other hand it achieves particularly high sensitivity. As a result of the ability to dispense with the use of complex, sensitive and high-resolution spectrometers for detection, the invention achieves particularly simple interferometry, which is insensitive to disturbances and has a particularly high resolution capability, in particular for position-resolved measurements, surveys or imagings of objects and/or their positions in various sizes.

In this case, the principle according to the invention is not restricted to one specific spectral range of the electromagnetic measurement signal or electromagnetic radiation (also referred to without any restriction in the following text as "light") and/or a specific order of magnitude of the objects to be examined. In fact, the invention can be used in all spectral ranges which are currently available and will be available in the future, as well as for various orders of magnitude and/or distances to the objects to be examined. In this case, the resolution capability is preferably limited only by diffraction effects of the electromagnetic radiation used, that is to say it depends on the wavelength of the radiation used. A shorter wavelength therefore preferably allows greater spatial resolution.

Preferably, a section, in particular a pixel or a cell, of a position-resolving detector, in particular of a detector array, having a multiplicity of optical detector elements is used as an optical detector element. In particular, the capability to dispense with the use of a high-resolution spectrometer (for example of a diffractive grating spectrometer) makes it possible to produce a spatially two-dimensional image in an efficient manner at the same time by the use of a detector array (also referred to as a line-scan detector), for example a CCD camera and/or a CMOS camera. In this case, there is no need for spectral resolution, or this has already been carried out by the superimposition of the resonance behavior of the two-beam interferometer and the frequency comb spectrum. A line-scan detector which is spectrally integrating at least in spectral subranges is therefore preferably used.

The production of the electromagnetic measurement signal preferably comprises:
production of an electromagnetic output signal with a continuous spectrum; and
conditioning or filtering of the output signal by means of a tunable multi-beam interferometer in order to produce the electromagnetic measurement signal with a frequency comb spectrum such that the frequency comb intervals Δf_Signal of the measurement signal are varied in time in a modulation interval ([Δf_Signal_min;Δf_Signal_max]) of the frequency comb intervals.

In this case, a Fabry-Perot interferometer is preferably used as the multi-beam interferometer. By way of example, a super luminescence diode is used to produce the output signal with a substantially continuous spectrum. In another preferred embodiment, the electromagnetic measurement signal is produced by means of a tunable frequency comb laser.

The method preferably comprises determination of a frequency comb modulation interval Δf_Source_Mod from the detected values of the intensity and/or intensity changes of the interference signal (that is to say with the aid or assistance of the detected values of the intensity and/or intensity changes of the interference signal), with the frequency comb modulation interval Δf_Source_Mod being determined in particular as the frequency comb interval Δf_Signal for the maximum modulation of the detected signal profile of the interference signal; and/or as the frequency comb interval Δf_Signal for the signal maximum in the detected signal profile of the interference signal, and/or;

as the frequency comb interval Δf_Signal at the signal centroid of the detected signal profile of the interference signal. That is to say, in particular, the frequency comb interval Δf_Signal is varied over time in a predetermined manner, while the intensity and/or intensity change of the interference signal are/is measured or detected for a multiplicity of values of the frequency comb interval Δf_Signal. That value of the predetermined and varied frequency comb interval Δf_Signal at which the maximum of the modulation of the detected signal profile of the interference signal and/or the signal maximum occurs in the detected signal profile of the interference signal and/or the signal centroid of the detected signal profile of the interference signal is preferably determined therefrom as the frequency comb modulation interval Δf_Source_Mod. The mean value of the frequency comb interval Δf_Signal weighted with the magnitude of the detected values of the intensity and/or intensity changes of the interference signal is preferably regarded as the signal centroid.

The method particularly preferably comprises determination of a value of the optical path-length difference x_O from the frequency comb modulation interval Δf_Source_Mod using x_O=c/Δf_Source_Mod with the speed of light c.

The method preferably comprises:
a first scanning process (also referred to occasionally in the following text as long scan) such that the frequency comb intervals Δf_Signal are in this case varied continuously; and
a second scanning process (also referred to occasionally in the following text as short scan), which is carried out repeatedly (in particular periodically) during the first scanning process, such that the optical path-length difference x_O is in this case varied continuously such that the continuous change in the quotient c/x_O resulting from this corresponds to the mathematical sign after the continuous change, at least at times, in the frequency comb intervals Δf_Signal which occurred in the first scanning process, wherein an intensity and/or an intensity change of the interference signal are/is in each case detected during the second scanning process. An intensity and/or intensity change of the interference signal is preferably detected in a time period of the second scanning process, which is carried out repeatedly, in which the change in the frequency comb intervals Δf_signal corresponds to the mathematical sign after the change in the quotient c/x_O. This efficiently results in a reduction in the phase angle rate in the interference image while a record is being produced by means of the detector element.

In another preferred embodiment, the method comprises:
a first scanning process (also referred to occasionally in the following text as long scan), such that the optical path-length difference x_O is in this case varied continuously; and
a second scanning process (also referred to occasionally in the following text as short scan), which is carried out repeatedly (in particular periodically) during the first scanning process, such that the frequency comb intervals Δf_Signal are in this case varied continuously such that the change in the frequency comb intervals Δf_Signal corresponds to the mathematical sign after the continuous change, at least at times, in the quotient c/x_O resulting from the first scanning process, wherein an intensity and/or an intensity change of the interference signal are/is in each case detected during the second scanning process. An intensity and/or intensity change of the interference signal is preferably detected in a time period of the second scanning process, which is carried out repeatedly, in which the change in the frequency comb intervals Δf_Signal corresponds to the mathematical sign after the change in the quotient c/x_O. This efficiently results in a reduction in the phase angle rate in the interference image while a record is being produced by means of the detector element.

Preferably, an intensity and/or intensity change is detected during a detector integration time period ΔtD, during which the magnitude of the phase in the interference signal changes through no more than 180 degrees.

Preferably, the second scanning process has a sawtooth profile of the optical path-length difference x_O or of the reciprocal 1/Δf_Signal of the frequency comb intervals Δf_Signal over time, wherein an intensity and/or intensity change of the interference signal is detected during the long flank of the sawtooth profile.

In another preferred embodiment, the second scanning process is in the form of a harmonic oscillation of the optical path-length difference x_O or of the reciprocal 1/Δf_Signal of the frequency comb intervals Δf_Signal over time, wherein an intensity and/or intensity change of the interference signal is detected in a time period which includes the harmonic oscillation passing through that point or point of inflection of the movement in locus space (that is to say in particular that point which has the maximum rate magnitude) at which the change in the frequency comb intervals Δf_Signal corresponds to the mathematical sign after the change in the quotient c/x_O. This preferably corresponds to the maximum point of the intensity or modulation in the interference signal.

Furthermore, the invention provides an apparatus for interferometry, which comprises:
a measurement signal source for production of an electromagnetic measurement signal;
an interferometer arrangement which is designed
to split or divide the measurement signal into a scanning beam component and a reference beam component, in particular using a beam divider element of the interferometer arrangement,
to illuminate at least one object point with at least one portion of the scanning beam component, in particular using an objective of the interferometer arrangement; and
to produce an interference signal by superimposition of a portion of the scanning beam component which has been reflected from the at least one object with the reference beam component, wherein that portion of the scanning beam component in the interference signal which has been reflected from the at least one object point has an optical path-length difference x_O, which depends on the position of the object point, relative to the reference beam component;
wherein the measurement signal source is designed to produce the measurement signal with a frequency comb spectrum with the same frequency comb intervals Δf_Signal of the individual frequency components, and/or wherein the apparatus also comprises a frequency comb filter which is designed to filter the interference signal such that the filtered interference signal now has only a frequency comb spectrum with the same frequency comb intervals Δf_Signal of the individual frequency components; and wherein the apparatus also comprises:
a control device for varying the frequency comb intervals Δf_Signal in the frequency comb spectrum of the measurement signal or of the filtered interference signal and/or for varying the optical path-length difference x_O over time such that the frequency comb intervals Δf_Signal correspond at least at times to an integer multiple of the quotient c/x_O of the speed of light c and the optical path-length difference x_O; and
at least one detector element for detection of an intensity and/or intensity change in the interference signal for a multiplicity of frequency comb intervals Δf_Signal and/or for a multiplicity of optical path-length differences x_O.

Preferably, the interferometer arrangement comprises a Fizeau interferometer and/or a Michelson interferometer and/or a Twyman-Green interferometer, and/or a Mirau interferometer and/or a Linnik interferometer and/or a Mach-Zehnder interferometer.

In one preferred embodiment, the measurement signal source comprises a tunable frequency comb laser. In a further preferred embodiment, the measurement signal source comprises:
a radiation source for production of an electromagnetic output signal with a continuous spectrum; and
a frequency comb filter, in particular a tunable multi-beam interferometer such as a Fabry-Perot interferometer, having an adjustable or variable delay length Y, for filtering the output signal in order to produce the electromagnetic measurement signal with a frequency comb spectrum such that the frequency comb intervals Δf_Signal of the measurement signal can be varied over time in a modulation interval ([Δf_Signal_min;Δf_Signal_max]) of the frequency comb intervals.

Preferably, the measurement signal source comprises a first signal scanning device for carrying out a first scanning process or signal scanning process (occasionally also referred to in the following text as a long scan), such that an optical delay length or path length Y of the signal path in the measurement signal source is in this case varied continuously, and a second signal scanning device for carrying out a second scanning process or signal scanning process (occasionally also referred to in the following text as a short scan), which is carried out repeatedly (in particular periodically) during the first signal scanning process, such that, in this case, the optical delay length or path length Y of the signal path in the measurement signal source is varied continuously such that the change in the optical delay length resulting from the second signal scanning process is opposite the mathematical sign after the change, at least at times, in the optical delay length resulting from the first signal scanning process.

Therefore, the method for interferometry preferably comprises a corresponding first and second signal scanning process. In this case, an intensity and/or intensity change of the interference signal is preferably in each case detected during the second signal scanning process. An intensity and/or intensity change of the interference signal is preferably detected in a time period of the second signal scanning process, which is carried out repeatedly, in which the variation of the optical delay length resulting from the second signal scanning process is opposite the mathematical sign after the change in the optical delay length as a result of the first signal scanning process. This efficiently reduces the phase angle rate in the interference image while a record is being produced using the detector element. In this case, the first and the second signal scanning devices preferably form two physically separate scanners (one for the long scan and one for the short scan) in the measurement signal source. A staircase function is preferably formed, at least approximately, over time for the frequency intervals by the predetermined, synchronized interaction thereof. Therefore, the phase angle rate preferably does not vary at regular time intervals, or varies only so slightly that an interference image can then in each case be recorded with particularly good resolution by a line-scan detector. This is particularly advantageous especially for miniaturized measurement systems with a small numerical aperture since there is then preferably no need to carry out a mechanical scanning process on the sensor.

The apparatus preferably comprises an optical waveguide for transmission of the measurement signal from the measurement signal source to the interferometer arrangement.

Preferably, the control device is designed to control a first and a second scanning process synchronously such that in the first scanning process, the frequency comb intervals $\Delta f\_Signal$ are varied continuously; and in the second scanning process, which is carried out repeatedly during the first scanning process, the optical path-length difference $x\_O$ is varied continuously such that the continuous change in the quotient $c/x\_O$ resulting from this corresponds to the mathematical sign after the continuous change, at least at times, in the frequency comb intervals $\Delta f\_Signal$ produced during the first scanning process, and wherein the control device is designed to control the at least one detector element such that an intensity and/or intensity change of the interference signal are/is detected in each case during the second scanning process.

In another preferred embodiment, the control device is designed to control a first and a second scanning process synchronously such that in the first scanning process, the optical path-length difference $x\_O$ is varied continuously; and in the second scanning process, which is carried out repeatedly during the first scanning process, the frequency comb intervals $\Delta f\_Signal$ are varied continuously such that the change in the frequency comb intervals $\Delta f\_Signal$ corresponds to the mathematical sign after the continuous change, at least at times, in the quotient $c/x\_O$ produced during the first scanning process, and wherein the control device is designed to control the at least one detector element such that an intensity and/or intensity change of the interference signal are/is detected in each case during the second scanning process.

The invention therefore achieves, in particular, measurement systems with a measurement of scanning accuracy which can be adapted over a wide scale, from subnanometric resolution to millimetric resolution depending on the requirement, leading to economic use. Another aim in this case is for the measurement to be highly robust.

One aim in this case is to allow measurements to be carried out with miniaturized sensors even at long object distances or with great object depths, or else on difficult object surfaces, at the expense of possibly reduced depth resolution.

This is achieved in particular in that, during optical scanning of the object surface at various depths of the object space or object distances, electromagnetic (optical) signals are provided from these depths, for example even for object distances in the order of magnitude of one meter, with a particularly suitable signal form, which in particular can be evaluated particularly well, for a measurement array covering an area or at least for a measurement array in the form of a line. A large number of laterally adjacent object elements or object points can in this case be measured in a preferred manner at the same time. In particular, this means that electromagnetic (optical) signals which can be evaluated well can be provided quickly during the electromagnetic (optical) scanning of objects using the method according to the invention, by means of a camera which detects the object preferably over an area and/or on a line. The electromagnetic (optical) signals obtained lead in particular to measurement results which can be evaluated comparatively well, in particular uniquely. In this case, in particular, it is possible to dispense with the use of a spectrometer or a plurality of spectrometers in the interferometric measurement system. However, color cameras can preferably be used as detectors.

In this case, the term light is invariably used as a synonym for electromagnetic radiation, in particular from the Terahertz range, through the infrared range, to the deep UV range.

Furthermore, highly unique signals are also obtained for measurements on a wider or a coarser scale by also using the invention with light sources having a spectral three-dB width of, for example, only 5 nm to 10 nm. The use of spectrally narrowband light sources results in considerable technical and financial advantages in the implementation of an optical measurement system since, because of this, the chromatic influences and aberrations of the optical components used are somewhat less important.

In this case, a further advantage is also that measurements can be carried out over a wide scale by different sensors, designed on the basis of the inventive approach, and in each case in all three spatial coordinates—including depth. This is preferably also possible in a measurement volume of, for example, 20 µm×20 µm×20 µm up to one cubic meter. The upper limits for the measurement volume which can be detected are governed only by the available light energy and by the available measurement time as well. On the microscopic scale, only the diffraction limit can preferably be perceived as the limiting factor for the lateral resolution, and the achievable effective lateral resolution can be improved further by suitable numerical methods. Subnanometric resolution is also achieved for depth resolution when using suitable components. This results in wide scaleability of the measurement method, in particular in terms of the measurement resolution in depth. A sensor preferably has correspondingly small dimensions.

Fields of use for the solution according to the invention are, in particular: microform and microprofile measurement, the measurement of roughness and miniform measurement, shape measurement on non-cooperative surfaces or on only slightly cooperative surfaces, for example human liver tissue. One example of the use of the invention is in this case also detection of the microform on the inner ear in human beings in the surgical operation phase, as well as intra-oral form detection of human teeth.

A further preferred field of use of the invention is form detection on technical teeth in gearboxes and on objects with a high aspect ratio. One field of use which is also preferred is, moreover, high-precision measurement of the shape of partially reflective, poorly light-scattering, and in this case highly inclined gearbox tooth surfaces.

A further preferred field of use is also represented by the measurement of polished and non-polished aspherical surfaces in a transmission and reflective aspherical surfaces, spectacle lenses and free-form surfaces, in particular for optical imaging.

In particular, the invention can also be used for geometric measurements in ophthalmology. Use in endoscopic 3D systems leads to high measurement accuracy sensor solutions which can be miniaturized well.

In particular, the invention can also be used for determining the optical thickness n'·d, where n' is the optical refractive index and d is the geometric path length, or the optical path lengths n'·d of biological micro-objects, cells or cell components in diagnostics and analysis without the use of markings.

In this case, cells or cell components can be measured laterally with high precision, that is to say also in the form of images, in terms of the distribution and variation of their optical thicknesses. Furthermore, living cells or components of living cells can also be detected by passing light through them or by incident light, in the form of images, relating to the optical thickness distributions or variations thereof in a process.

The method and the apparatus for interferometry, in particular for scaleable confocal interferometry, can be used by passing light through or by incident light in a scanning process in order to preferably also read data from an optical bulk memory, for example in the form of an optical multilayer memory, thus allowing the method to also be used in a preferred manner for high-speed reading of optical data from optical bulk memories.

One particularly advantageous motivation for the use of the invention in various applications is to allow the use of "interferometric gain" for measurements even on a rather macroscopic scale. This is particularly highly advantageous, for example, in machine construction, because many objects do not require interferometric depth resolution, but profit from the known "interferometric gain". For example, interferometry can also be used for comparatively good depth detection in measurement terms on object elements with very low reflectivity.

In one preferred embodiment, the invention provides a method and an apparatus or arrangement for scaleable confocal interferometry by passing light through or in incident light using a scanning measurement process for relative or absolute depth measurement or distance measurement for a technical or biological object, or of object elements, for microscopic, mesoscopic or macroscopic 2D or 3D detection of technical or biological objects, or for OC tomography or for OC microscopy or for endoscopic 2D or 3D metrology or for measurement of layer thicknesses, resolved laterally or over time, or their lateral or time variations.

The method and the apparatus or arrangement for scaleable confocal interferometry by passing light through or with incident light using a scanning process preferably also allow data to be read from an optical bulk memory, for example in the form of an optical multi-layer memory, thus allowing the method also to be used in particular for high-speed reading of optical data from optical bulk memories. In this case, the presence and the geometric distribution of reflective or light-scattering elements are detected in the volume of a data storage medium.

One preferred method will be described in the following text. In this case, the following means, in particular, are used in the method:
either a confocal, object-imaging interferometer at least approximating to a two-beam characteristic,
and/or a chromatically-confocal object-imaging interferometer at least approximating to a two-beam characteristic—that is to say with predetermined chromatic depth splitting of foci in the object area,
at least one light source, in which case light should be understood in the sense of electromagnetic radiation of Terahertz through IR and VIS radiation to UV radiation.

In this case, the object-imaging interferometer preferably has an optical path-length difference x_O other than zero at each optically detected object element. It should preferably be at least two micrometers. The optical path-length difference can typically, however, also be significantly greater—in the extreme case up to the region of several millimeters, or up to several meters. On the basis of this optical path-length difference x_O, the maxima of an at least approximately sinusoidal frequency wavelet—which is in each case associated with an optically detected object element—by computation each have a frequency interval of $\Delta f\_Object = c/x\_O$—where c is equal to the speed of light in a vacuum and x_O is equal to the optical path-length difference in the object-imaging two-beam interferometer, associated with the respectively optically detected object element. The variable $\Delta f\_Object$ corresponds precisely to the period length in the wavelet.

Furthermore, it is preferable to at least arrange a line-scan detector, which detects in a spectrally integral form at least in spectral subranges, that is to say for example with a very large number of pixels, for this electromagnetic radiation. In particular, this line-scan detector preferably therefore has a single spectral channel in each pixel. This can therefore be a conventional gray-scale CCD or gray-scale CMOS camera, which registers only gray-scale values, but not colors in each pixel. A color camera can be used, which is likewise not yet considered to be a spectrometer, but as camera with three or four spectral channels.

The light source is preferably a frequency comb light source in the optical system. In this case, the frequency comb preferably covers a certain spectral range. The frequency comb intervals of the light source $\Delta f\_Source$ are gradually varied in a predetermined manner over time during the measurement process, over the entire spectral range of the light source. In this case, these frequency comb intervals can be varied in the range from a few parts per thousand to a few percentage points of the initial value. In the extreme, the changes may even amount to a multiple or a small fraction of the initial value of the frequency comb intervals $\Delta f\_Source$. Considered in relative terms, these variations in the frequency comb intervals $\Delta f\_Source$ can therefore be made very large.

In this case, preferably either the light source on the one hand is represented by a spectral continuum light source or at least by a quasi-continuum light source, and this light source is preferably followed by a multi-beam interferometer in which the optical delay length Y of the multi-beam interferometer is varied in a predetermined manner during the measurement process, thus resulting in a frequency comb characteristic being formed at least approximately during detection. This downstream arrangement relates to the entire area of the optical system, including the area immediately in front of the line-scan receiver, that is to say in the detection beam path. That is to say, the multi-beam interferometer is always arranged downstream from the light source, and upstream of the line-scan detector. In the case of a Fabry-Perot interferometer, the delay length Y is in this case equal to 2L, where L is the distance to the interferometer final mirror. Strictly speaking, this applies only to a vacuum arrangement, or approximately an arrangement in air, by approximating the refractive index to the value unity. In the case of multiple successive detection of the electromagnetic radiation during the measurement process, the frequency comb is in each case varied in a predetermined manner, with respect to the frequency intervals between the maxima or spikes, by varying this optical delay length Y in a predetermined manner, with the frequency intervals $\Delta f\_Source$ of the maxima or of the spikes in the frequency comb each being $\Delta f\_Source = c/Y$, where c is the speed of light in a vacuum, and these frequency intervals $\Delta f\_Source$ are varied in a predetermined manner during the measurement process by a predetermined variation of the optical delay length Y. This can be done by means of a piezo-translator at the mirror of a Fabry-Perot interferometer.

On the other hand, it is also possible for the light source to be a frequency comb laser which has an optical delay length Y. This frequency comb laser is constructed with an at least approximately equidistant frequency comb, but with frequency intervals Δf_Source of the maxima or spikes in the frequency comb which can be varied in a predetermined manner over time.

When the frequency comb is varied in a predetermined manner during the scanning measurement process, the frequency intervals Δf_Source in this case correspond at least once precisely to an integer multiple n, where n=1, 2, 3, 4, 5, 6, 7, . . . , of the calculated frequency intervals Δf_Object=c/x_O—where c is equal to the speed of light in a vacuum and x_O is equal to the optical path-length difference in the (object-imaging) two-beam interferometer, in each case associated with an optically detected object element P.

Then, the delay length Y in the frequency comb light source is an integer part of the optical path-length difference x_O in the object-imaging two-beam interferometer, or the delay length Y is equal to the optical path-length difference x_O, which corresponds to the situation where n=1. Thus:

$$x\_O = n \cdot Y, \text{ where } n=1,2,3 \ldots$$

This equality is produced by variation of the delay path length Y in the light source at least once during the measurement process for each scanned object element or object, thus resulting in a short-period modulation in the signal profile. This signal profile is sampled a plurality of times, over time, by means of spectrally integrally detecting, line-scan detectors, in which case at least one pixel of this spectrally integrally detecting, line-scan detector is in each case optically associated with one object element. In this case, the pixels of a color camera can also be regarded as spectrally integrally detecting sensor elements, in comparison to the sensor elements of a spectrometer.

The magnitude of the frequency intervals associated
   either with the maximum modulation of the signal profile,
   or with the signal maximum of the signal profile
   or with the signal centroid of the signal profile
is determined directly from the frequency comb light source as the value "Δf_Source_Mod" (which is also in some cases referred to here as the frequency comb modulation interval), or is calculated from the parameters of the frequency comb light source, such as the delay length Y=2L, and is stored.

In this case, the delay length Y_Mod during the occurrence of the modulation of the signal profile with Y_Mod=2L_Mod can be determined from the instantaneous interval L_Mod of the final mirror in a multi-beam interferometer by means of an associated measurement system. In the case of a multi-beam interferometer in air, the refractive index can in general—in particular on the microscopic scale—be approximated well to the value of unity. In this case, it is also possible to determine only variations in the delay length Y_Mod i for the various object elements i for various object elements i, and to evaluate these, by determining and storing the instantaneous intervals L_Mod i of the final mirror in the multi-beam interferometer, and making this available to the calculation of the associated optical path-length differences x_O i.

The predetermined scanning of the frequency intervals of the light source therefore makes it possible to equate Δf_Source and Δf_Object of an object element at one time, that is to say at least for a comparatively short time, once in the measurement process and, at least for a comparatively short time during the measurement process, the frequency intervals of the light source Δf_Source are an integer multiple n of the calculated frequency interval Δf_Object.

The predetermined scanning therefore allows the frequency intervals of the light source Δf_Source at one time during the measurement process to be equated to an integer multiple n of Δf_Object of the frequency wavelet of the object, which can be determined by calculation using Δf_Object=c/x_O.

If the frequency intervals Δf_Source are varied in a predetermined manner—that is to say during the measurement process—the line-scan detector for electromagnetic radiation is read repeatedly and successively, and the intensities are at least in some cases added up spectrally integrally in this case in each pixel of the line-scan detector. In this case, the detector may be a 2-dimensional monochrome CCD camera or a CMOS camera. In this case, at least one pixel is associated at least approximately with each object element by optical imaging. When using the chromatic-confocal approach, a color camera can be used to obtain coarse information relating to object distances, by evaluating the intensities in the color pixels.

However, it is also possible for the detector to be a color CCD camera or a color CMOS camera. In this case, three or four pixels are associated with each object element, but in different spectral ranges.

The situation in which Δf_Source=n·Δf_Object, or x=n·Y, where n=1, 2, 3 . . . , is therefore reached at least once when the frequency intervals Δf_Source are varied in a predetermined manner for each object element that can be detected. In this case, at least one short-period signal modulation is produced, detected and evaluated in the signal profile.

In this case, either the optical path-length difference x_O of the associated object element or at least the difference in the optical path-length difference with respect to adjacent object elements is determined from the value "Δf_Source_Mod" when the short-periodic signal modulation occurs in the signal profile via the known predetermined variation of the optical delay length Y of the multi-beam interferometer which is used as the basis for the variation of the frequency intervals Δf_Source, or the optical path-length difference x_O associated with an object element is also determined in an absolute form from the value "Δf_Source_Mod" with respect to the position "Y=0" in the multi-beam interferometer, when the optical delay length Y thereof is made known in an absolute form by measurement of Y, or the associated frequency intervals "Δf_Source_Mod" are determined, when using a frequency comb laser with a frequency comb which can be varied in a predetermined manner and with accurate knowledge of the respective frequency intervals Δf_Source when the short-periodic signal modulation occurs in the signal profile, and the optical path-length difference x_O of the associated object element is determined by calculation using x_O=c/Δf_Source_Mod from the values "Δf_Source_Mod", or at least one information item relating to the optical path-length difference x_O of the associated object element is calculated from the known predetermined variation of the frequency intervals Δf_Source with respect to adjacent object elements, that is to say the difference between the respective optical path-length difference and at least one adjacent object element, in that the frequency intervals Δf_Source_Mod i associated with each object element i are determined when the short-periodic signal modulation occurs in the signal profile.

If the optical refractive index n' or the refractive-index distribution in the object area is known at least approximately, the distance z_O of a respectively optically detected object element is preferably determined at least approximately by calculation in an absolute form or in relation to adjacent object elements from the previously determined optical path-length difference, using the relationship x_O=2n'·z_O.

However, the measurement may also preferably have the aim of determining solely the optical path-length difference x_O or variations in it Δx_O over time, for example when measuring thin biological objects.

In the case of chromatic depth splitting, when using the chromatic-confocal approach, by confocal discrimination of the overall spectrum of the light source, also referred to as the global spectrum, only one subrange is always used, that is to say only one subrange of the overall spectrum of the light source in each case contributes to signal formation in the pixels of the line-scan detector. For a given numerical aperture, the chromatic depth splitting therefore enlarges the depth, distance and range measurement area, but at the same time reduces the depth resolution since the 3 dB width of the detected signal becomes larger as the spectral range that is used becomes smaller. This reduces the measurement depth resolution.

The preferably predetermined choice of the level of the chromatic splitting during object illumination and object detection therefore makes it possible to chose the depth measurement range and the depth measurement resolution, and/or the distance measurement range and the distance measurement resolution, for the measurement by the choice of the magnitude of the chromatic refractive power of a sensor and therefore the spectral width of the light used for detection. If no chromatic splitting takes place in the sensor, the width of the overall spectrum of the light source, that is to say the wave number range which contributes to detection, is governed solely by the achievable measurement depth resolution.

In the case of arrangements having an object-imaging system with a small or very small numerical aperture for measurements on a coarse scale, it is also possible to dispense completely with chromatic depth splitting, provided that the wave-optical depth of field range is sufficiently great for the measurement task.

The signal modulation in the detected signal profile is preferably evaluated in order to determine the absolute or relative object depth when, during predetermined variation of the frequency comb, the situation $$\Delta f\_Source\_Mod = \Delta f\_Object$$

occurs, which corresponds to the situation in which $$x\_O = Y\_Mod.$$

In this case, n=1. In this case, the signal profile is not undersampled and this generally results in a comparatively good signal-to-noise ratio.

In the case of optical undersampling, that is to say when n is greater than 1, the scanning movement or scanning range required is advantageously reduced by the undersampling factor n. However, the signal profiles may then need to be scanned more finely in depth, since these then become narrower in width over the wave number.

In this case, it is also possible to successively detect a plurality of signal profiles with signal modulation by varying the frequency intervals Δf_Source. The respectively known optical delay length variations ΔY1, ΔY2, ΔY3 . . . , which are associated with the signal profiles with signal modulation when this occurs, can be used to determine the order n thereof in absolute form. The respective delay path length Y1, Y2, Y3 . . . can be determined from this in absolute form and, from this, the optical path-length difference x_O can be calculated in absolute form for each detected object element in the object-imaging interferometer, by means of a comparatively simple linear equation system. The object depth position z_O or the distance of an object element with respect to a system reference can then be determined from this.

However, it is furthermore also preferably possible for the light source to be in the form of a frequency comb light source with a non-variable optical delay length Y in the optical system, preferably in the form of a frequency comb microresonator, as already described in the literature in 2007. The frequency comb intervals Δf_Source are thus kept constant. In consequence, the optical path-length difference x of the object-imaging interferometer is in this case varied during the measurement process, by moving this object-imaging interferometer as a compact miniaturized module with fine graduations in the depth direction in relation to the object during the measurement process, and the line-scan detector is read a number of times. In this case as well, the signal profile is evaluated when equality on the optical path-length difference x_O occurs in an object element and an optical delay length Y. In this case, the object-imaging interferometer is preferably in the form of a slimline, miniaturized, Fizeau interferometer, which therefore has common-path characteristics. In many cases, it is technically easy to move an optical system such as this mechanically with fine graduations in the light direction.

Furthermore, the magnitude of the chromatic refractive power in the object-imaging interferometer can preferably be deliberately matched to the depth of the object to be measured, thus varying the extent of depth splitting.

Furthermore, it is possible to preferably adapt the width of the light spectrum used, that is to say the wave number range, as a function of the surface characteristics of the object and also of the dispersion of the optical medium in the object area, as well as the desired depth resolution. For this purpose, each light source, for example composed of individual light sources, for example superluminescence diodes, may be followed by a downstream Fabry-Perot interferometer. This means that the Fabry-Perot interferometer is arranged upstream of the line-scan detector. In this case, the superluminescence diodes can be operated and switched individually or in relatively small groups in order to operate with well-matched spectral ranges, in order to generate optical signal profiles which can be evaluated well for the respective object. When using powerful light sources, it is also possible to use controllable spectral filters, which control and adapt the width of the spectrum used. This is because strong dispersion in the optical medium of the object area can very greatly reduce the modulation depth in the signal profile if the spectral range in use is too extended. A major restriction to the spectral range used, that is to say to the wave number or frequency range, admittedly results in a reduction in the measurement accuracy by increasing the 3 dB width of the signal, but actually may for the first time allow measurement at all.

However, it is preferably also possible to be able to detect only the optical path-length difference or the optical path length at a point or element of a micro-object, for example a living cell. This means that the geometric path length is of no interest, or is of relatively little interest. This may be of major interest when monitoring biological cells or cell components without the use of markers, since the information relating to the sequences of sub-cellular processes is significantly expressed in many processes in particular in the variation of the optical path length. This variation is then measured with high resolution over time. Furthermore, this also makes it possible to detect accumulations of extremely thin layers on substrates. By way of example, these layers may consist of proteins. The elimination of the dispersion can in each case be carried out by using the same media, generally liquids, in the object area and in the multi-beam interferometer or laser resonator, in which case the optical attenuation of the medium must be taken into account.

However, it is also preferably possible to detect only the optical path-length difference or the optical path length at a point or element on a micro-object. This may be of major interest when monitoring biological cells or cell components without the use of markers, since the information relating to the sequences of sub-cellular processes is expressed significantly in the variation of the optical path length. This is then measured with high resolution over time.

Furthermore, the dispersion of the multi-beam interferometer can preferably be made at least approximately equal to the dispersion in the object area.

This is highly possible when measuring biological objects in an aqueous solution, in which the multi-beam interferometer, preferably an encapsulated Fabry-Perot interferometer, is likewise operated in water, as a result of which the multi-beam interference in the Fabry-Perot interferometer takes place in water. This leads to signal profiles with a high modulation level, since the dispersions can be matched very well in this way.

The following is preferably also proposed: as already described, a predetermined scan of the frequency intervals of the frequency comb light source is therefore carried out and is referred to in the following text here as an FC long scan with the time duration $\Delta t\_long\_fc$, since this is preferably carried out continuously, and preferably at least for as long as modulation occurs in the signal profile, that is to say a variable interference image is created at the output of the object-imaging interferometer.

As already described, this FC long scan should be carried out by varying $\Delta y$ the delay length Y in a multi-beam interferometer or by varying $\Delta y$ the optical delay length Y in the resonator of a frequency comb laser. At the same time as the long scan, that is to say the predetermined scan of the frequency intervals of the light source, at least three short scans, which are synchronized to this FC long scan, are preferably carried out either in the reference arm or in the object arm of the object-imaging interferometer, whose time durations $\Delta t\_short\_Int$ are preferably made considerably shorter than the time duration $\Delta t\_long\_fc$ of the long scan. At least for a portion of the time duration $\Delta t\_short\_Int$, these short scans result in a reduction in the phase angle rate in the interference image to be recorded by means of the line-scan detector, including a phase angle rate with the magnitude zero, in that both the magnitude of the delay length Y and the magnitude of the optical path-length difference $x\_O$ in each case both increase or in each case both decrease in the time period $\Delta t\_short\_Int$. The resultant phase angle rate $d\phi/dt$ in radians is therefore at least approximately in the short scan, which is synchronized to the long scan of the frequency comb light source, of the object-imaging interferometer:

$$d\phi/dt = [2\pi \cdot n\Delta Y/(\Delta t\_short\_Int \cdot \lambda\_S)] - [2\pi \cdot \Delta x\_O/(\Delta t\_short\_Int \cdot \lambda\_S)]$$

where n is the integer order number, $\Delta Y/\Delta t\_short\_Int$ is the variation $\Delta y$ of the delay length Y in the time period $\Delta t\_short\_Int$ in the short scan, that is to say a rate, and $\lambda\_S$ is the centroid wavelength and $\Delta x\_O/\Delta t\_short\_Int$ is the variation $\Delta x\_O$ of the optical path-length difference $x\_O$ in the time period $\Delta t\_short\_Int$. The phase angle rate $d\phi/dt$ becomes zero when the magnitudes and the mathematical sign of $n\Delta Y$ and $\Delta x\_O$ are in each case equal in the time period $\Delta t\_short\_Int$.

This assumes that both $\Delta Y$ and $\Delta x\_O$ are each both increased by the same amount or each both decreased by the same amount for n=1 in the time period $\Delta t\_short\_Int$, that is to say during the short scan process. In this case, the phase angle rate $d\phi/dt$ can in this case also reach the magnitude zero by synchronization of the FC long scan and the short scan. For the magnitude zero, the interference image does not change in the time period $\Delta t\_short\_Int$.

These short scans, which vary the optical path-length difference in the object-imaging interferometer, are preferably advantageously carried out in the reference arm when the object-imaging interferometer has a chromatic-confocal beam path in the object arm. Chromatic depth splitting therefore takes place in this case, allowing sharp imaging of the optically scanned object elements in the measurement area, as a result of which there is generally no need to carry out a scan in the object arm. This also has design advantages for miniaturization of the measurement apparatus or arrangement, since this means that the object arm can remain free of movement means. In the case of an apparatus or arrangement subject to the requirement for a comparatively large depth measurement range, the short scans may, however, preferably also be carried out in the object arm.

Each individual short scan is preferably carried out such that this results in a variation in the optical path-length difference $\Delta x\_O$ in the object-imaging interferometer, with the magnitude of this variation preferably amounting at most to one third of the variation $n\Delta Y$ in the long scan, where Y is the delay length of the multi-beam interferometer with respect to the resonator of the frequency comb laser, where n is in this case the integer multiple, which has already been introduced, where n=1, 2, 3 . . . . The variation in the optical path-length difference $\Delta x\_O$ in the object-imaging interferometer during a short scan is typically actually one tenth of the variation $n\Delta Y$, or even considerably less than this. When n=1, for the variation of the optical path-length difference $\Delta x\_O$ in the object-imaging interferometer, this in fact means one tenth or even less of the variation $\Delta Y$ of the multi-beam interferometer or of the resonator of the frequency comb laser during a long scan.

At least one interference image is preferably recorded in the time period of a short scan $\Delta t\_short\_Int$, by means of a line-scan detector with the detector integration time tD, with the phase in the interference image preferably being varied in magnitude through a maximum of 180 degrees during the detector integration time period $\Delta tD$, but typically only through a magnitude of between zero degrees and 90 degrees. The case of a zero degree phase variation in the detector integration time period $\Delta tD$ means that the FC long scan and each short scan are exactly synchronized. For the case of n=1 and zero degrees phase variation, it follows that the magnitude of the variation of the optical path-length difference in the object-imaging interferometer in the detector integration time period $\Delta tD$ is preferably at least approximately equal to the magnitude of the variation $2\Delta L$ of twice the mirror distance 2L in a Fabry-Perot interferometer, or is made to be at least approximately equal to the magnitude of the variation $\Delta Y$ of the delay length Y in a cyclic multi-beam interferometer, or is made to be at least approximately equal to the magnitude of the variation $\Delta Y$ of the delay length Y in a resonator of a frequency comb laser.

The time duration of a short scan $\Delta t\_short\_Int$ can be made to be at least approximately equal to that of the detector integration time period $\Delta tD$.

For the case of zero degrees phase variation, the interference phenomenon in the detected pixels of the line-scan detector is in practice at least approximately unchanged in the detector integration time period ΔtD. Piezo-controllers which operate in a synchronized manner can be arranged, for variation of the optical path-length difference, in the object-imaging interferometer or in a multi-beam interferometer or in the resonator of a frequency comb laser.

Furthermore, the short scans preferably at least approximately have a sawtooth profile of the optical path-length difference x_O of the object-imaging interferometer over time, with interference images preferably being recorded by means of a line-scan detector within the time period Δt_short_Int during the sawtooth profile while passing through the long flank of the tooth. The time duration of the long flank in this case preferably corresponds at least approximately to the integration time period ΔtD of the line-scan detector. The magnitude of the variation of the optical path-length difference in the object-imaging interferometer can preferably be chosen freely between two directly successive short scans. In this case, the magnitude of this variation is preferably at least approximately the same as the order of magnitude of the centroid wavelength in the spectrum being used.

Furthermore, it is preferably possible for short scans to be carried out preferably at least approximately in the form of a harmonic oscillation. This means that the optical path-length difference x_O in the object-imaging interferometer varies such that it oscillates at least approximately harmonically. Interference images are preferably recorded by means of a line-scan detector within the time period Δt_short_Int in the at least approximately linear part of the movement/time profile of the oscillation, with the oscillation amplitude being chosen such that the phase variation of the interference is at most 180 degrees in the detection integration time period ΔtD, but is actually preferably a value of less than 90 degrees.

In this case, the image recording frequency is preferably made to be equal to the frequency of the harmonic oscillation, or to an integer multiple of it.

Therefore at least three short scans are preferably carried out for each FC long scan, and therefore at least three interference images are recorded by means of a line-scan detector in the FC long scan. However, in general, at least ten short scans are preferably carried out and ten interference images are therefore recorded in the FC long scan, although normally preferably scarcely more than one hundred interference images. However, without the synchronized short scans, at least one hundred to one thousand interference images, for example, would in general have to be recorded in the FC long scan or short-term exposure would have to be used for the work during the detection process. This is comparatively technically complex and time-consuming.

The advantage of this method with an additional short scan relating to the FC long scan is that it provides high utilization of the available light energy for detection, since the sum of the detector integration times in the FC long scan can always be 90% of the time duration of the long scan. A further major advantage is that this method can be used with interferometers which are of major interest technically and financially, in particular two-beam interferometers, and which in principle have a path-length difference which is never equal to zero. In this case, as representative for all interferometers with an optical path-length difference which is never equal to zero, only the Fizeau interferometer with an object arranged remotely from the reference surface, the asymmetric Linnk interferometer with a triple reflector in the reference arm, and the asymmetric Mach-Zehnder interferometer will be mentioned as examples.

However, furthermore, it is also possible to also record a plurality of interference images by means of a line-scan detector in each short scan. The line-scan detector may be in the form of a monochrome, color-matrix-CCD or CMOS camera.

In one preferred apparatus or arrangement for scaleable confocal interferometry by passing light through or in incident light, using a scanning measurement process for relative or absolute depth measurement or distance measurement of a technical or biological object or of object elements, the following means are used for microscopic, mesoscopic or macroscopic 2D or 3D detection of technical or biological objects, for OC tomography, for OC microscopy, for endoscopic 2D or 3D metrology of technical or biological objects, for measurement of layer thicknesses, resolved laterally or over time, or for their lateral variations or variations over time:

either a confocal, object-imaging interferometer having an at least approximately two-beam characteristic, or a chromatic-confocal, object-imaging interferometer having an at least approximately two-beam characteristic—that is to say with predetermined chromatic depth splitting of foci in the object area and at least one light source, with the term light in this case meaning electromagnetic radiation of Terahertz through IR, VIS to UV radiation.

In this case, the object-imaging interferometer has an optical path-length difference which is preferably not zero at each optically recorded object element. This difference should preferably be at least two micrometers. The optical path-length difference may, however, also typically be considerably greater in the interferometer—in the extreme up to the region of several millimeters to several meters. On the basis of this optical path-length difference, the maxima of an at least approximately sinusoidal frequency wavelet—in each case associated with an optically recorded object element—by calculation in each case have a frequency interval of Δf_Object=c/x_O—where c is equal to the speed of light in a vacuum and x_O is equal to the optical path-length difference in the object-imaging two-beam interferometer, associated with the respectively optically recorded object element. The variable Δf_Object corresponds precisely to the period length in the wavelet.

Furthermore, at least one line-scan detector, which detects spectrally integrally at least in spectral subranges, is provided for this electromagnetic radiation.

The light source is preferably in the form of a frequency comb light source in the optical system, whose frequency comb intervals Δf_Source are varied gradually in a predetermined manner over time during the measurement process.

In this case, the light source is represented either by a spectral continuum light source or at least by a quasi-continuum light source, and this light source is followed by a multi-beam interferometer with the single optical delay length Y of the multi-beam interferometer being varied in a predetermined manner during the measurement process. The multi-beam interferometer has means for varying the single optical delay length Y. The multi-beam interferometer preferably has high finesse, in order to achieve good discrimination.

Alternatively, the light source is represented by a frequency comb laser with the optical delay length Y, and this frequency comb laser has an at least approximately equidistant frequency comb, but has frequency intervals Δf_Source, which can be varied in a predetermined manner over time, of the maxima or spikes in the frequency comb. This frequency comb laser has means for varying the single optical delay length Y. The frequency comb laser can preferably also be in the form of a Terahertz laser. It is also possible for the frequency comb laser preferably to have a micro-resonator, that is to say a comparatively short optical delay length Y, with a wavelength range in the infrared range between 1400 nm and 1700 nm, and a frequency separation of several 100 GHz.

Furthermore, it is also possible for a plurality of frequency comb lasers preferably to be operated in parallel, for example in each case one in the red, in the green and in the blue spectral range, and to preferably use a conventional RGB three-chip color camera for detection. Three pixels (RGB) are then preferably optically associated with each object element. Depending on the chromatic depth splitting, objects can then be optically scanned at the same time at different depths or at different distances, leading to a considerable reduction in the measurement times by parallelization and to an increase in the reliability of the measurement as a result of redundancy.

Furthermore, the multi-beam interferometer can preferably have a cyclic optical waveguide/fiber arrangement. The multi-beam interferometer is preferably tuned by highly dynamic, computer-controlled, mechanical stretching of the fibers. In this case, the fibers are preferably wound onto a computer-controllable piezo-strain bar.

In a further preferred apparatus or arrangement for scaleable confocal interferometry by passing light through or in incident light, the following means are used for relative or absolute depth measurement or distance measurement of a technical object or of object elements, for microscopic, mesoscopic or macroscopic 2D or 3D detection of objects, for OC tomography, for OC microscopy, for endoscopic 2D or 3D metrology of technical or biological objects, or for layer thickness determination in a scanning measurement process:

either a confocal, object-imaging interferometer having an at least approximately two-beam characteristic, or a chromatic-confocal, object-imaging interferometer having an at least approximately two-beam characteristic—that is to say with predetermined chromatic depth splitting of foci in the object area—and at least one light source, with light in this case meaning electromagnetic radiation of Terahertz through IR, VIS to UV radiation.

In this case, on the one hand, the light source is preferably represented by a spectral continuum light source or by a quasi-continuum light source, and this light source is followed by a multi-beam interferometer.

Alternatively, on the other hand, the light source is preferably represented by a frequency comb laser with the optical delay length Y. This frequency comb laser preferably has a micro-resonator.

In this case, the object-imaging interferometer always has an optical path-length difference $x\_O$ which is not zero at each optically detected object element. On the basis of this optical path-length difference $x\_O$, the maxima of an at least approximately sinusoidal frequency wavelet—which is in each case associated with an optically detected object element—by calculation in each case has a frequency separation of $\Delta f\_Object = c/x\_O$—where c is equal to the speed of light in a vacuum and $x\_O$ is equal to the optical path-length difference in the object-imaging interferometer, associated with the respectively optically detected object element. The variable $\Delta f\_Object$ corresponds precisely to the period length in the wavelet.

Furthermore, at least one line-scan detector, which detects spectrally integrally at least in the spectral subranges, is provided for this electromagnetic radiation.

Means for predetermined variation of the optical path-length difference are preferably associated with the object-imaging interferometer.

The frequency separations of an at least approximately sinusoidal frequency wavelet with the frequency separations $\Delta f\_Object = c/x\_O$—where c is equal to the speed of light in a vacuum and $x\_O$ is equal to the optical path-length difference in an object element—can preferably be varied in a predetermined manner. It is therefore possible to achieve the situation in which the optical path-length difference $x\_O$ is equal to the fixed-set optical delay length Y when the optical path-length difference is varied, and a modulated signal profile is detected, from which, if the refractive index in the object medium is known at least approximately, depth or distance information can be determined at least approximately by calculation for an object element. In this case, the sensor is tuned such that the optical delay length Y is set such that a sharp image of an object element is produced on one pixel of the line-scan detector when this delay length Y and the optical path-length difference $x\_O$ in this object element are equal.

Furthermore, the multi-beam interferometer or the frequency comb laser in the apparatus or arrangement for scaleable confocal interferometry is preferably formed using optical waveguides.

Furthermore, the multi-beam interferometer or the frequency comb laser in the apparatus or arrangement for scaleable confocal interferometer preferably has a cyclic beam profile.

The object-imaging interferometer can preferably also be in the form of a Fizeau interferometer, Michelson interferometer, Twyman-Green interferometer, Mirau interferometer, Linnik interferometer—also with a triple reflector in the reference arm—or a Mach-Zehnder interferometer. In this case, the interferometer in each case has an associated imaging system for object illumination and for object detection.

This relates to a preferred method for scaleable interferometry by passing light through or in incident light using a scanning measurement process for relative or absolute depth measurement or distance measurement of a technical or biological object or of object elements, for microscopic, mesoscopic or macroscopic 2D or 3D detection of technical or biological objects, for OC tomography, for OC microscopy, for endoscopic 2D or 3D metrology or for measurement of layer thicknesses, resolved laterally or over time, or their lateral variations or variations over time.

The preferred method for scaleable interferometry by passing light through or in incident light using a scanning process also allows data to be read from an optical bulk memory, for example in the form of an optical multilayer memory, thus in principle also allowing the method to be used for reading optical data quickly from optical bulk memories. In this case, the presence and the geometric distribution of reflective or light-scattering elements in a volume of a data storage medium is detected.

The following text describes one preferred method for scaleable interferometry by passing light through or in incident light, using a scanning measurement process.

In this case, the following means are preferably used in the method:

either an object-imaging interferometer having an at least approximately two-beam characteristic, or a confocal, object-imaging interferometer having an at least approximately two-beam characteristic, at least one light source, in which case light means electromagnetic radiation of Terahertz through IR, VIS to UV radiation.

In this case, the object-imaging interferometer has an optical path-length difference x_O which is not zero at each optically detected object element. This optical path-length difference x_O should have at least the magnitude of the shortest wavelength used for detection from the light source. The optical path-length difference may, however, also typically be considerably greater—in the extreme up to the region of several millimeters, or else up to several meters. On the basis of this optical path-length difference x_O, the maxima of an at least approximately sinusoidal frequency wavelet—which is in each case associated with an optically detected object element—in each case have, by calculation, a frequency separation of Δf_Object=c/x_O—where c is equal to the speed of light in a vacuum and x_O is equal to the optical path-length difference in the object-imaging interferometer, associated with the respectively optically detected object element. The variable Δf_Object corresponds to the period length in the wavelet.

At least one line-scan detector, which detects spectrally integrally at least in spectral subranges, is also provided, that is to say for example a detector having a multiplicity of pixels, for this electromagnetic radiation. In general, therefore, this line-scan detector preferably has a single spectral channel in each pixel. This may therefore be a conventional gray-scale CCD or gray-scale CMOS camera, which registers only gray-scale values, but not colors in each pixel. A color camera can be used, which is likewise not yet considered to be a spectrometer, but is a camera with three or four spectral channels.

According to one preferred embodiment of the interferometric method of the invention, the optical path-length difference is varied at least approximately continuously or quasi-continuously during the measurement of an object, that is to say during the measurement process, in the object-imaging interferometer, with either the optical path in the object arm or the optical path in the reference arm thereof being varied at least approximately continuously, that is to say with one interferometer arm in each case remaining unchanged. In this case, this path-length difference variation represents an interferometer long scan, which is carried out in the time period Δt_long_Int.

The light source is preferably a frequency comb light source in the optical system. In this case, the frequency comb covers a certain spectral range. The frequency comb intervals of the light source Δf_Source are varied in a predetermined manner over time within the overall spectral range of the light source during the measurement process. These variations of the frequency comb intervals Δf_Source are referred to as short scans, which are carried out in the time period Δt_short_fc and are synchronized to the interferometer long scan and the line-scan detector—and either the light source is on the one hand represented by a spectral continuum light source or at least by a quasi-continuum light source, and this light source is followed by a multi-beam interferometer with the optical delay length Y of the multi-beam interferometer being varied in a predetermined manner during the measurement process, such that, at least approximately, a frequency comb characteristic is formed during the detection. This downstream arrangement relates to the entire area of the optical system, including the area immediately in front of the line-scan receiver, that is to say in the detection beam path. Therefore, the multi-beam interferometer is always arranged downstream from the light source and upstream of the line-scan detector. In the case of a Fabry-Perot interferometer, the delay length is in this case Y=2L, where L is the distance between the interferometer end mirrors. To be precise, this applies only to a vacuum arrangement, and approximately to an air arrangement, when the refractive index is approximated to the value unity.

On the other hand, it is also possible for the light source to be represented by a frequency comb laser which has an optical delay length Y. This frequency comb laser has an at least approximately equidistant frequency comb, but has frequency intervals Δf_Source, which can be varied in a predetermined manner over time, of the maxima or spikes in the frequency comb.

Preferably, during the detection of the electromagnetic radiation during the measurement process, the predetermined variation of the frequency comb is in each case carried out with respect to the frequency intervals between the maxima or spikes by varying this optical delay length Y in a predetermined manner as a short scan, and at least three short scans of the frequency comb light source are carried out during the time period Δt_long_Int of the interferometer long scan. Therefore, in this case, the time duration Δt_long_Int is at least three times as long as the time period Δt_short_fc. The frequency intervals Δf_Source of the maxima or of the spikes in the frequency comb are in each case Δf_Source=c/Y, where c is the speed of light in a vacuum. These frequency intervals Δf_Source are varied in a predetermined manner during the measurement process, by predetermined variation of the optical delay length Y.

Preferably, therefore, at the same time as the interferometer long scan—either in the reference arm or in the object arm of the object-imaging interferometer—at least three FC short scans are carried out, which are synchronized to this interferometer long scan and whose time duration Δt_short_fc is made to be considerably shorter than the time duration Δt_long_Int of the long scan. Preferably—at least for a portion of the time duration Δt_short_fc—these short scans result in a reduction in the phase angle rate in the interference image to be recorded by means of a line-scan detector, including a phase angle rate with the magnitude zero, in that both the magnitude of the delay length Y and the magnitude of the optical path-length difference x_O in the time duration Δt_short_fc are in each case both increased or in each case both decreased.

The resultant phase angle rate dϕ/dt in radians during the short scan of the frequency comb light source is therefore at least approximately in each case:

$$d\phi/dt = [2\pi \cdot \Delta x\_O/(\Delta t\_short\_fc \cdot \lambda\_S)] - [2\pi \cdot n\Delta Y/(\Delta t\_short\_fc \cdot \lambda\_S)]$$

with the short scan being synchronized to the long scan of the object-imaging interferometer, where n is an integer order number n=1, 2, 3 . . . , and Δx_O/Δt_short_fc is the variation Δx_O of the optical path-length difference x_O in the time period Δt_short_fc, and ΔY/Δt_short_fc is the variation Δy of the delay length Y in the time duration Δt_short_fc in the short scan, that is to say a rate, and λ_S is the centroid wavelength. The phase angle rate dϕ/dt becomes zero when the magnitudes and the mathematical sign of n·ΔY and Δx_O are the same in the time period Δt_short_Int.

This assumes that both ΔY and Δx_O each both increase by the same amount or each both decrease by the same amount for n=1 in the time period Δt_short_fc, that is to say during the FC short scanning process. The phase angle rate dϕ/dt can in this case also reach the magnitude zero as a result of the synchronization of the interferometer long scan and the FC short scan, as a result of which the interference image does not vary in the time period Δt_short_fc.

The frequency intervals Δf_Object=c/x_O—where c is equal to the speed of light in a vacuum and x_O is equal to the optical path-length difference in the object-imaging interferometer, associated with a respectively optically detected object element P, preferably correspond, at least once and at least approximately to an integer fraction of the frequency intervals $\Delta f\_Source=c/Y$ when the path-length difference $x\_O$ is varied in a predetermined manner in the object-imaging interferometer during the scanning measurement process, in this case during the time period $\Delta t\_long\_Int$ of this interferometer long scan, such that $\Delta f\_Object=\Delta f\_Source/n$, where $n=1, 2, 3, 4 \ldots$.

Then, the optical path-length difference $x\_O$ in the object-imaging interferometer, at least approximately in the time period $\Delta t\_short\_fc$ of at least one single short scan, is an integer multiple of the delay length Y in the frequency comb light source, such that $$x\_O = n \cdot Y$$

where $n=1, 2, 3, 4, \ldots$. However, then, the delay length Y in the time period $\Delta t\_short\_fc$ of a single FC short scan can also at least approximately be equal to the optical path-length difference $x\_O$, which corresponds to the case when $n=1$. Therefore, at least a single FC short scan can be carried out at least approximately in the time period $\Delta t\_short\_fc$:

$$x\_O = Y.$$

This equality is produced by preferably continuous variation of the optical path-length difference $x\_O$ of the object-imaging interferometer at least once, and at least approximately during the measurement process for each scanned object element or object. The signal profile is sampled a plurality of times in the time period $\Delta t\_long\_Int$ by means of a line-scan detector which detects spectrally integrally, in which case at least one pixel of this spectrally integrally detecting, line-scan detector is in each case optically associated with one object element. In this case, the pixels of a color camera can also still be considered to be spectrally integrally detecting sensor elements, in comparison to the sensor elements of a spectrometer.

The magnitude of the frequency intervals associated
either with the maximum modulation of the signal profile,
or with the signal maximum of the signal profile
or with the signal centroid of the signal profile
is calculated and stored as the value "$\Delta f\_Object\_Mod$" from the parameters of the object-imaging interferometer, preferably the depth position of the object-imaging interferometer.

In this case, the depth position of each object element when the modulation of the signal profile occurs can be determined by a position measurement system which is associated with the object-imaging interferometer or with components of it, for example on the object itself or for example on the mechanical bases of the object-imaging interferometer, and scaling of the value "$\Delta f\_Object\_Mod$" over the measured values of the position measurement.

In this case, it is also possible to determine and evaluate only variations in the measured values of the position measurement for the various object elements i for different object elements i, preferably by determining and storing measured values of the position measurement when the modulation occurs, in each pixel associated with an object element, and by using this to calculate the depth position of each object element. Phase information can also be determined during this process.

The line-scan detector for electromagnetic radiation is read a plurality of times successively during the measurement process and, during this process, the intensities are at least partially spectrally integrally added in each pixel of the line-scan detector. The detector may in this case be an area monochrome CCD camera or a CMOS camera. In this case, at least one pixel is at least approximately associated with each object element by optical imaging.

However, it is also possible for the detector to be a color CCD camera or a color CMOS camera. Then, three or four pixels, but in different spectral ranges, are associated with each object element.

Preferably, if the optical refractive index n' or the refractive index distribution in the object area is known at least approximately, the distance $z\_O$ of a respectively optically detected object element can be determined at least approximately by calculation absolutely or in relation to adjacent object elements from the optical path-length difference, determined in advance—for example at the modulation maximum—using the relationship $x\_O = 2n' \cdot z\_O$.

However, the sole aim of the measurement may preferably also be to determine the optical path-length difference $x\_O$ or variations $\Delta x\_O$ of it over time, for example when measuring thin biological objects.

In this case, during the interferometer long scan, a relative movement between the object-imaging interferometer or at least components of it and the object is preferably carried out in the object arm, such that focusing through the object area takes place during the time period $\Delta t\_long\_Int$, and the object or elements of the object is or are imaged at least approximately wave-optically sharply at least at one time in the time period $\Delta t\_long\_Int$.

Furthermore, in the method for scaleable interferometry, the short scans preferably have an optical delay length Y over time at least approximately with a sawtooth profile.

Furthermore, in the preferred method for scaleable interferometry, interference images are preferably recorded by means of a line-scan detector within the time period $\Delta t\_short\_fc$, preferably when passing through the long flank of the tooth of the sawtooth profile.

Furthermore, in the method for scaleable interferometry, the magnitude of the variation of the optical path-length difference in the object-imaging interferometer between two directly successive short scans can preferably be chosen freely.

Furthermore, in the method for scaleable interferometry, short scans are preferably carried out at least approximately in the form of a harmonic oscillation, and interference images are recorded by means of a line-scan detector within the time period $\Delta t\_short\_fc$, preferably in the at least approximately linear part of the profile of the delay length Y over the time of the oscillation. In this case, the oscillation amplitude is furthermore preferably chosen such that the phase variation of the interference in the detector integration time period $\Delta tD$ is at most 180 degrees. The image recording frequency of the line-scan detector is preferably chosen to be the same as the frequency of the harmonic oscillation, or an integer multiple of it.

The object can preferably be imaged telecentrically, centrally perspectively, or pericentrally, the latter for example for the minimum-invasive operation technique, laparoscopy.

On the one hand, the light source may preferably be a frequency comb laser with a macro-resonator with frequency intervals of several 100 MHz. The frequency intervals of this macro-resonator in the frequency comb can be designed to be tunable.

The light source may preferably on the other hand be a frequency comb laser with a micro-resonator with frequency intervals of several 100 GHz.

The frequency intervals of this micro-resonator in the frequency comb can be designed to be tunable.

The object imaging system must be designed to be at least approximately diffraction-limited because, otherwise, signals which cannot be evaluated well would be produced. The numerical aperture of the object-imaging system may, however, be chosen within very wide limits, depending on the purpose and the technical options. Values of NA=1.3 for water immersion and up to NA=0.001 for air systems can be provided for the imaging system.

The magnitude of the chromatic refractive power for object illumination and imaging is preferably chosen such that the resultant depth splitting of the foci is in each case matched to the depth of the object to be measured. No refocusing of the object-imaging system is therefore required.

BRIEF DESCRIPTION OF THE DRAWINGS

FIG. 16 shows an apparatus or arrangement that is suitable for microscopic or mesoscopic application.

FIG. 17 shows the profile over time.

FIG. 18 illustrates the relationship in time.

FIG. 19 illustrates a wavelet created by scanning the comparatively high-frequency interference wavelet, with the created wavelet having a frequency that is considerably lower than that of the interference wavelet.

FIG. 20 illustrates one approach for measurements of microscopically small objects with a comparatively large numerical aperture and with a short wave-optical depth of focus.

FIGS. 21 and 22 illustrate the relationship in time.

FIG. 23 illustrates the voltage profile that results in the electronic system for system control of the output of the camera amplifier over a long scan.

DETAILED DESCRIPTION OF THE PREFERRED EMBODIMENTS

The invention will be described by way of example with reference to the preferred embodiments illustrated in FIGS. 1 to 26. In this case, the term light is always used synonymously for electromagnetic radiation from the Terahertz, through the infrared, to the deep UV spectrum.

Figure 1:
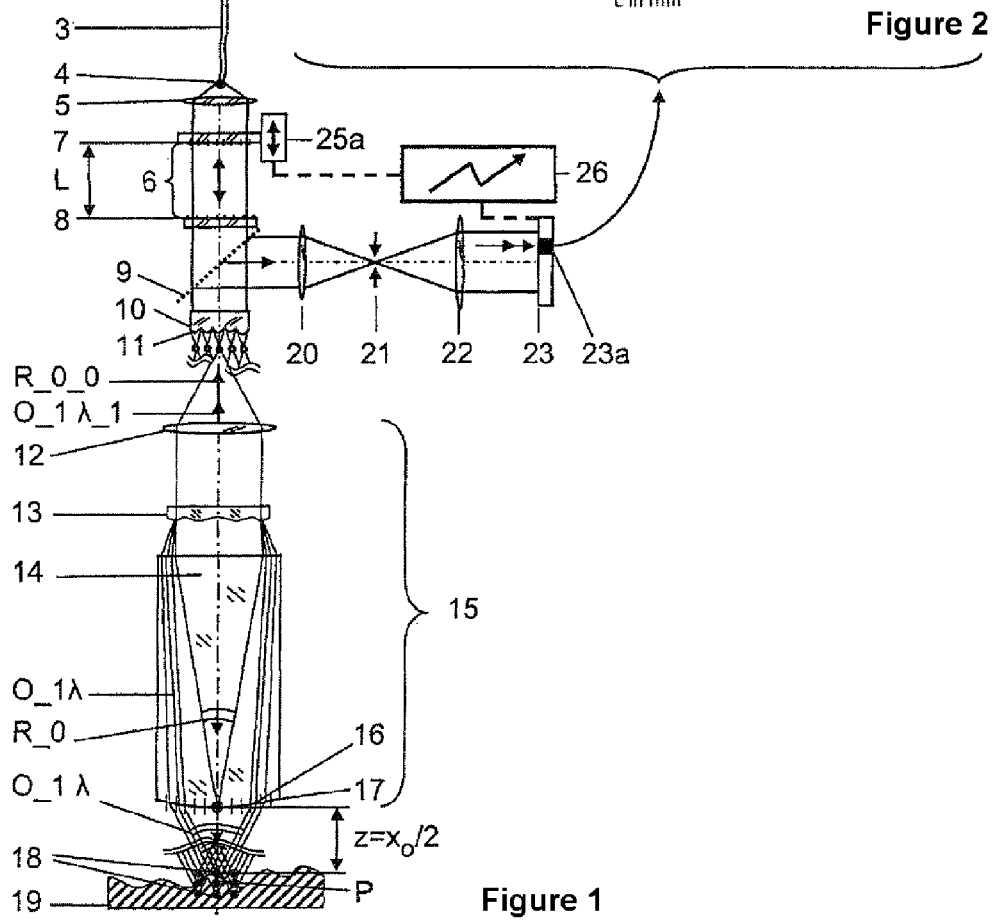
FIG. 1 shows a sensor on the basis of a chromatic-confocal, spectral two-beam interferometer with a multi-beam interferometer arranged downstream from the light source.

FIG. 1 shows the sensor on the basis of a chromatic-confocal, spectral two-beam interferometer with a multi-beam interferometer arranged downstream from the light source, for a relatively small object field with respect to the focal length of the object-imaging system. The light from an optically powerful, fiber-coupled superluminescence diode 1a in the near infrared range is injected by means of focusing optics 2 into a single-mode fiber 3, emerges from this single-mode fiber 3 again at its outlet 4, is collimated by an objective lens 5 and is passed into a Fabry-Perot interferometer 6, in this case in the form of a Fabry-Perot interferometer 6 with the mirror separation L, with which a piezo-controller 25a is associated. An optical isolator, which is not illustrated here, is arranged between the fiber-coupled superluminescence diode 1a and the Fabry-Perot interferometer 6, and this is intended to apply to all the subsequent exemplary embodiments. This Fabry-Perot interferometer has two highly reflective partially transparent mirrors 7 and 8, separated by the distance L, thus resulting in high-finesse multi-beam interference at the outlet of the Fabry-Perot interferometer 6. A multi-beam interference spectrum with a frequency comb characteristic is therefore produced from the incoming continuum spectrum, or quasi-continuum spectrum, of the superluminescence diode 1. The transmitted, narrowband spectral components in this case form a comb with equidistant intervals $\Delta f\_Source$ in the wave number space, the k space, or the frequency space, the f space. Because of the multi-beam interference, the intervals between the maxima of the transmitted, narrowband intensities always, with high precision, have the same wave number difference $\Delta f\_Source$. The light which leaves the Fabry-Perot interferometer 6 with the spectral comb characteristic passes through a beam splitter 9 and arrives at a microlens array 10 with microlenses 11. Foci are formed. These are imaged by the objective lens 12 at infinity. On the focal plane of the objective lens 12, the light passes through a diffractive zone lens 13 with a light-scattering effect, which lens is in the form of a phase grating. Zero-order beams are created here, which act as reference beams $R\_0$, and first-order beams $O\_1\lambda$, with these beams representing chromatically depth-split, discretized object beams which, after focusing by means of a GRIN lens 14 and a light-refracting surface 16, form different depth positions of the foci in the object area, as a result of which a discretized focus chain 18 is formed for each imaged focus of a microlens over the wavelength $\lambda$, but only at those points in the spectrum where transmission exists through the transmission maxima of the comb spectrum of the Fabry-Perot interferometer 6. The objective lens 12, the diffractive zone lens 13, the GRIN lens 14 and the light-refracting surface 16 together form a chromatic imaging system 15. The reference beams $R\_0$, which are created at the zero diffraction order downstream from the diffractive zone lens 13, are focused sharply on the light-refracting surface 16, thus resulting in a relatively small field of foci there, with this light-refracting surface 16 at the same time also representing the reference surface in the two-beam interferometer. A beam-splitter layer 17 with a comparatively low reflection level is formed on the light-refracting surface 16. The reference beams $R\_0$ are reflected back into the sensor after reflection on the beam-splitter layer 17. The beams in the first order $O\_1\lambda$ in contrast enter the object area, where the object 19 is also located which is precisely or at least approximately coincident with one of the foci of the focus chain 18 in each object element. The light from all the beams of order $O\_1\lambda$ that is scattered back from the surface of the object 19 passes via the light-refracting surface 16 and via the GRIN lens 14 back to the diffractive zone lens 13. Reference beams R_0_0 are now produced there on the diffractive structure from the reference beams R_0 by light diffraction in the zero diffraction order, and the object beams O_1λ_1 are now produced there from the object beams O_1λ by light diffraction in the first diffraction order. Both the reference beams R_0_0 and the discretized object beams O-1λ_1 are subject to confocal discrimination at the confocal aperture 21 after re-entering the microlens array 10, being output through the beam splitter 9 and focusing by the objective lens 20. The imaging takes place from there via the objective lens 22 onto the CCD camera 23, thus resulting in each case one reference beam and, if a detected object element is present, also a confocally discriminated object beam in each pixel of this CCD camera 23. Interference occurs between these beams. In this case, because of the confocal discrimination, only light from the object beams O_1λ_1 arrives at the pixels of the CCD camera 23, which was approximately sharply focused. Object beams, that is to say those at a wavelength λ were imaged at least approximately sharply on the surface of the object 19 and are also imaged sharply on a pixel of this CCD camera 23, by virtue of the design of the optical arrangement. When the optical delay length in the Fabry-Perot interferometer 6 is varied, the intensities are scanned by means of the CCD camera 23. The synchronization, control and electrical drive for varying the delay length Y of the Fabry-Perot interferometer 6 by means of the piezo controller 25a and the drive for the CCD camera 23 are carried out via the electronic modules of the electronic system 26, which are not illustrated here, for system control and for synchronization, and this also contains a computer, which also evaluates the camera signals.

Figure 2:
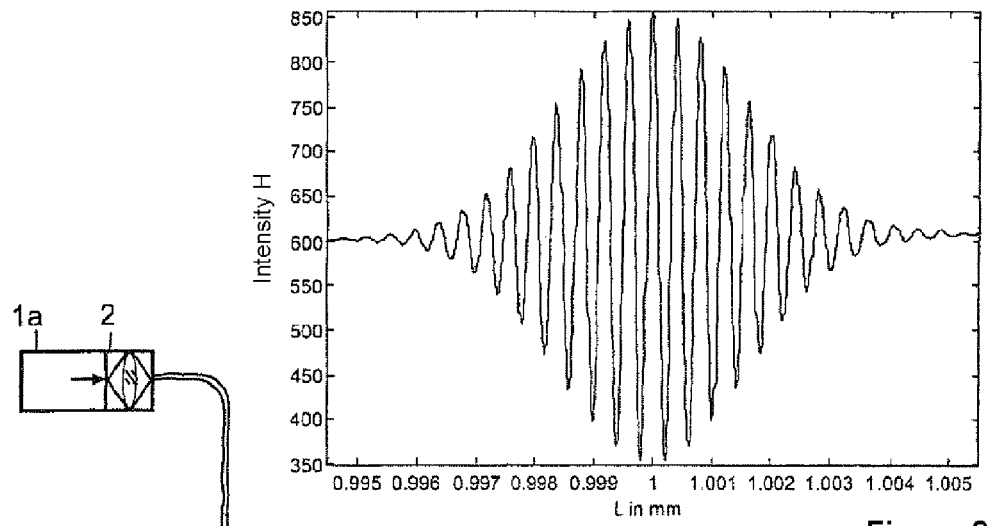
FIG. 2 shows the intensity of a detected object element.

FIG. 2 shows the intensity of a detected object element, which is imaged on the pixel 23a, of the object 19 as occurs in a pixel 23a of the CCD camera 23—when the distance L between the mirrors in the Fabry-Perot interferometer 6 is varied. In this case, the optical system is dispersion-free and has a negligible phase offset. The figure shows the intensity profile in the form of a wavelet on the pixel 23a of the CCD camera 23 when the distance L between the mirrors in the Fabry-Perot interferometer 6 is varied at a constant rate, and the situation when Δf_Object is equal to Δf_Source is reached and passed through while varying the distance L between the mirrors. The object element scanned by the pixel 23a is 1 mm away from the reference surface 16. In this case, the light source a has a spectrum with a Gaussian envelope, with the wavelength range from 720 nm to 920 nm.

Figure 3:
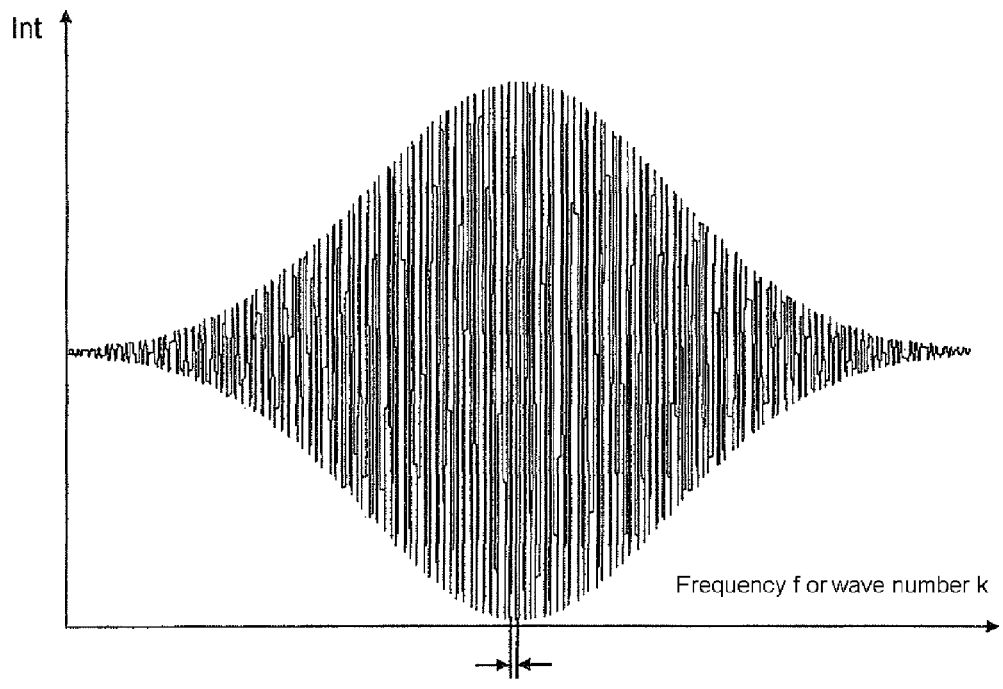
FIG. 3 shows an object wavelet.

FIG. 3 shows an object wavelet which is determined by calculation using λf_Object=c/x_O, calculated for an optical path-length difference of x_O=200 µm, with the spectrum of the light source having a Gaussian profile. This relates in particular to a wavelet as can be expected from theory, and which would result from interference of a component of incident light reflected on the beam-splitter layer 17 and a component of the incident light reflected on the object 19, with a continuous Gaussian spectrum. This object wavelet could possibly even be detected in an optical system as shown in FIG. 1 by means of a suitable continuum light source and by means of a high-resolution spectrometer, if the Fabry-Perot interferometer 6 is then removed for this purpose and the continuum light source has a Gaussian profile in the spectrum. Since the light which is incident on the beam-splitter layer 17 does not have a continuous spectrum in the actual measurement, but has a frequency comb spectrum, the wavelet illustrated in FIG. 3 also does not occur directly. However, this wavelet illustrates the interference condition in the two-beam interferometer that is used.

Figure 4:
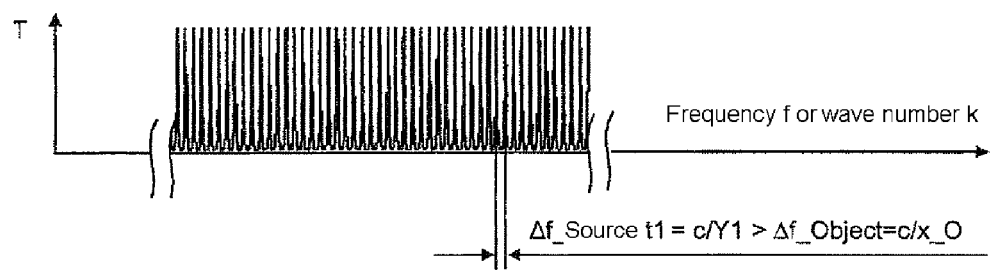
FIGS. 4 and 5 show comb spectra.
Figure 5:
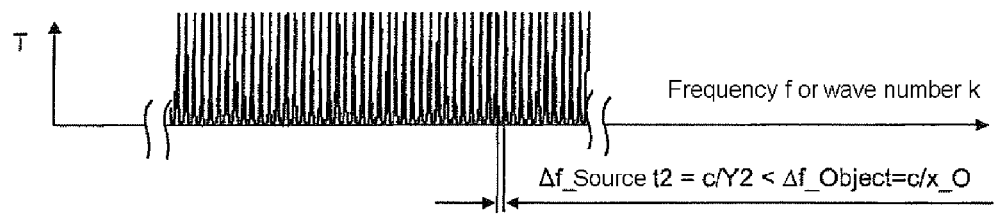

FIG. 4 shows the comb spectrum relating to a time t1 when the optical delay length Y, in this case represented by the distance L between the mirrors where Y=2L, is still comparatively short, that is to say the delay length Y1 is somewhat shorter than the optical path-length difference x_O in a scanned object element. As the distance L between the mirrors becomes greater, the frequency interval Δf_Source decreases. This is illustrated in FIG. 5. In this case, FIG. 4 and FIG. 5 each in particular show the transmission of the Fabry-Perot interferometer 6. This therefore does not relate directly to the spectrum of light emerging at the Fabry-Perot interferometer 6 in the embodiment shown in FIG. 1, which likewise, for example, has only a finite spectral width because the spectral width of the light source that is used is finite.

Figure 6:
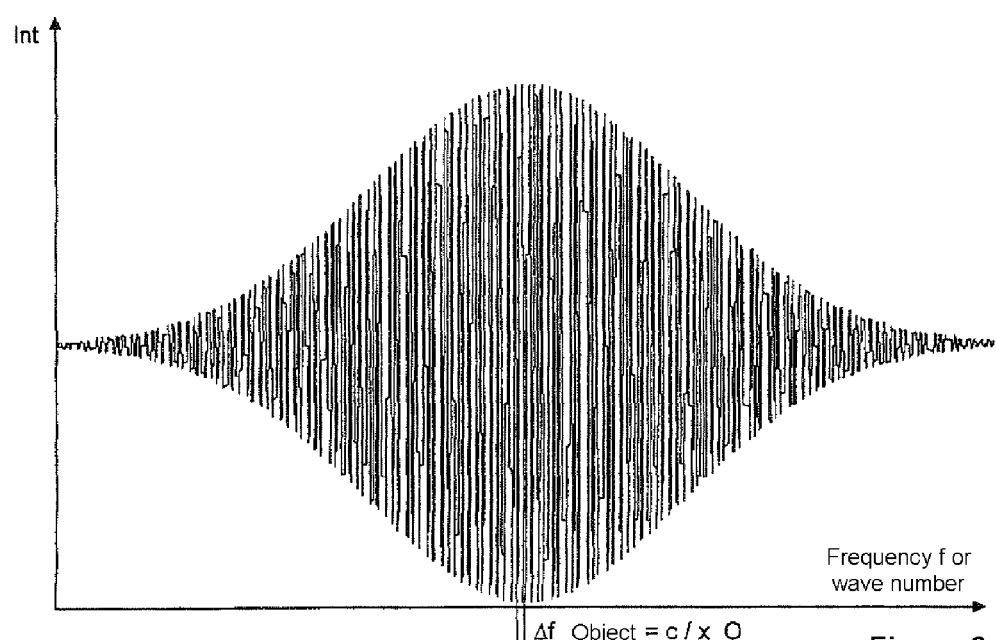
FIGS. 6 and 7 show a situation where the frequency intervals of the source and object are the same.
Figure 7:
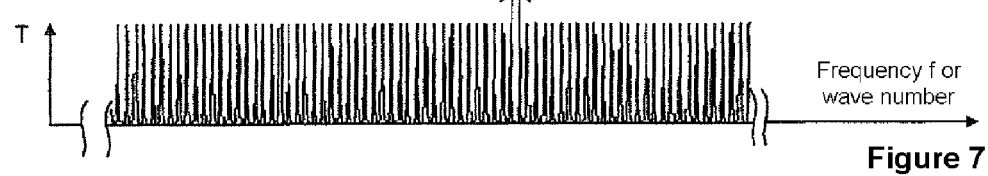

FIGS. 6 and 7 show the situation in which the frequency intervals of Δf_Source and Δf_Object are the same, that is to say the situation: Δf_Source=Δf_Object at an object point P on the object 19 in FIG. 1. This situation results in signal modulation in the signal profile over the distance L between the mirrors in the Fabry-Perot interferometer 6.

Figure 8:
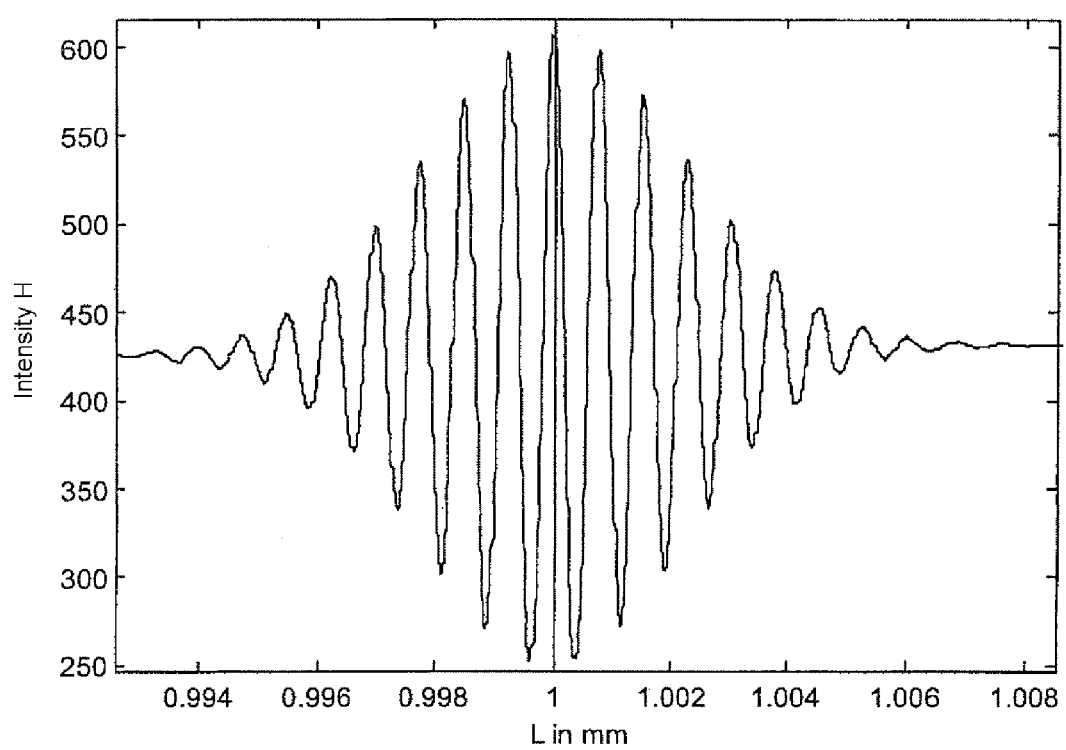
FIG. 8 is a signal profile.

This signal profile is illustrated in FIG. 8. This figure shows a signal profile in a pixel 23a of the CCD camera 23 as recorded by continuous variation of the distance L between the mirrors in the Fabry-Perot interferometer 6 during the frequency comb scan, and as results by addition of all the spectral components which have been able to pass through the confocal aperture 21. In this case, the optical path-length difference is x_O=200 µm, and the spectral range with the enveloping Gaussian profile is between 1300 and 1800 nm. The chromatic restriction of the spectrum by confocal discrimination is therefore low in this case, since the chromatic depth splitting is likewise low in this case. The 3 dB width of the signal modulation plotted against the distance L between the mirrors, and therefore over the optical delay length Y=2L is governed solely by the spectral range in the wave number or frequency space on which this is based. In this case, the optical path-length difference x_O of the object-imaging interferometer has no influence on this 3 dB width. The phase offset and dispersion can, however, considerably vary the signal profile recorded in a pixel and can produce asymmetries in the signals, as well as a skew or chirp, as a result of which these signals then require somewhat greater numerical complexity for evaluation. Nevertheless, even then, the signal waveform still remains comparatively simple. The influence of speckling on the scanning of rough surfaces, that is to say phase fluctuations from one spectral element to another, can likewise very considerably vary the signal waveform, however. In the case of cooperative object surfaces, it may be possible to at least somewhat reduce this influence by comparatively fast lateral movement of the microlenses, although this may somewhat reduce the lateral resolution.

Figure 9:
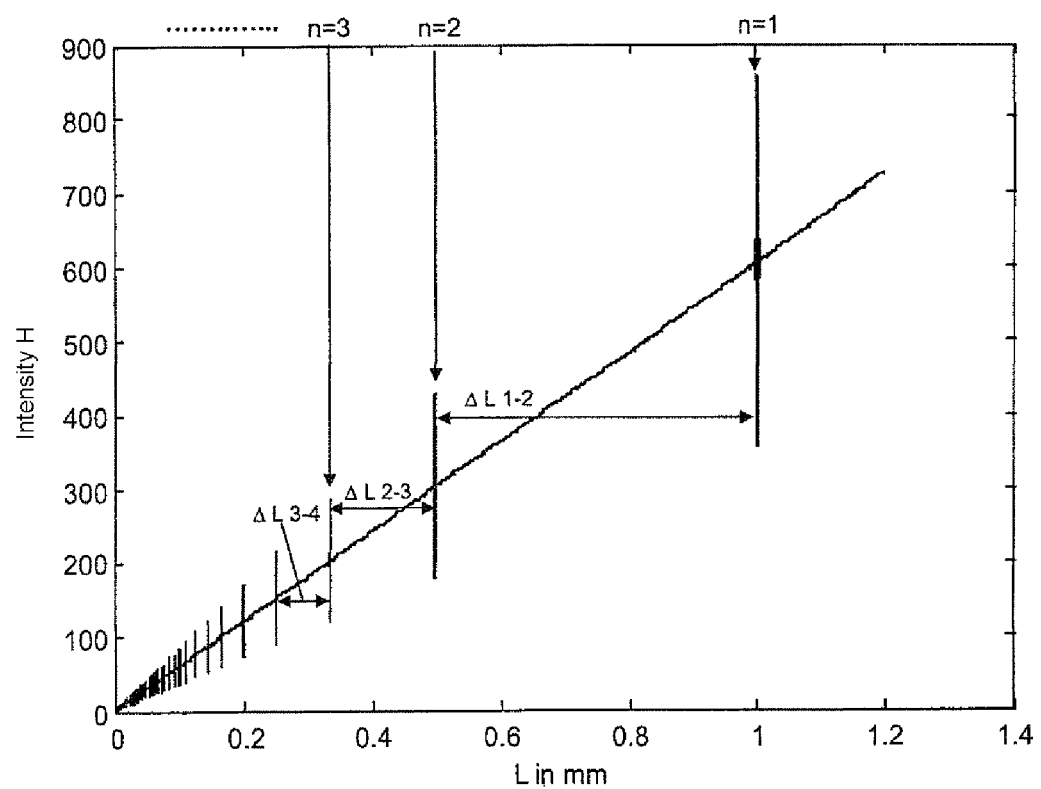
FIG. 9 shows signal profiles plotted against the variable distance between the end mirrors of the Fabry-Perot interferometer.

FIG. 9 shows signal profiles plotted against the variable distance L between the end mirrors of the Fabry-Perot interferometer 6, for a plurality of orders n where n=1, 2, 3 . . . for a spectral range that is used from 720 nm to 920 nm with a Gaussian envelope, and the optical path-length difference for an optically detected object element in the object-imaging interferometer of x_O=2 mm. These signal profiles can then be detected in each case in one pixel of the CCD camera 23, which is optically associated with the object element. For the situation where n=0, each needle of a frequency comb relates to precisely one period of the object wavelet. For the situation where n=2, each needle of a frequency comb relates to every second period of the object wavelet, and for the situation in which n=3, each needle of a frequency comb relates to every third period of the object wavelet, etc. The situation where n=1 as a signal profile in a pixel 23a has already been illustrated in FIG. 2.

Figure 10:
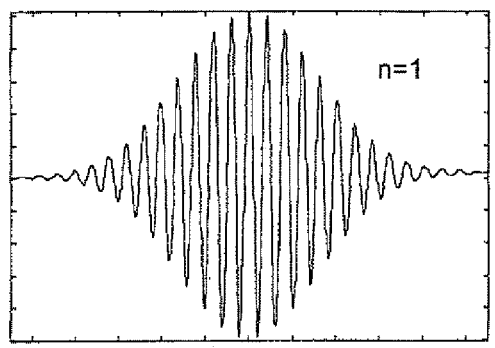
FIGS. 10-13 illustrate possible signal profiles for the orders n where n=1, 2, 3, 4.
Figure 11:
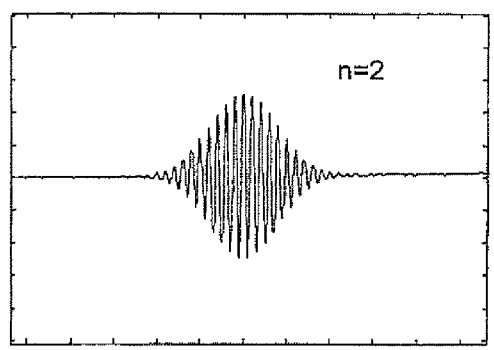
Figure 12:
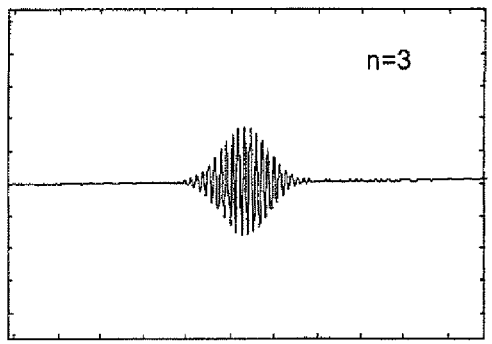
Figure 13:
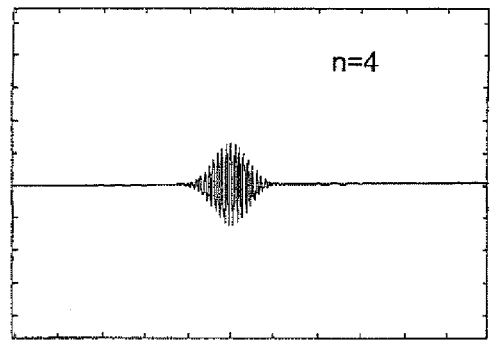

FIGS. 10 to 13 illustrate the possible signal profiles for the orders n where n=1, 2, 3, 4, in detail, with the signal profile in FIG. 10 corresponding to the signal profile in FIG. 2. As the order number n becomes greater, the 3 dB width of the signals becomes ever less, that is to say narrower and of lesser intensity. The distance between the modulated signals likewise becomes ever less as n becomes larger. When a plurality of signal profiles with orders n>1 are recorded, the absolute order of these signal profiles can be determined by means of a comparatively simple equation system relating to the variations $\Delta L$ 2-3 and $\Delta L$ 3-4 determined by measurement, illustrated in FIG. 9, in general by means of a linear equation system. This then results in the optical path-length difference $x\_O$ in the object-imaging interferometer for each optically detected object element. The distance or the depth of an object element P can then be calculated at least approximately from this optical path-length difference $x\_O$, provided that the refractive index in the object area is also known, at least approximately.

Figure 15:
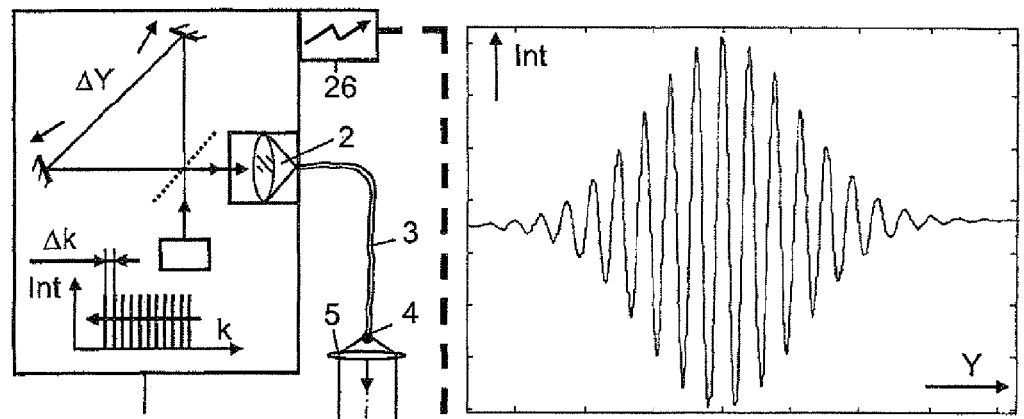
FIG. 15 illustrates the intensity wavelet that results on the pixel of the CCD camera during a Y scan of the tunable frequency comb laser.
Figure 14:
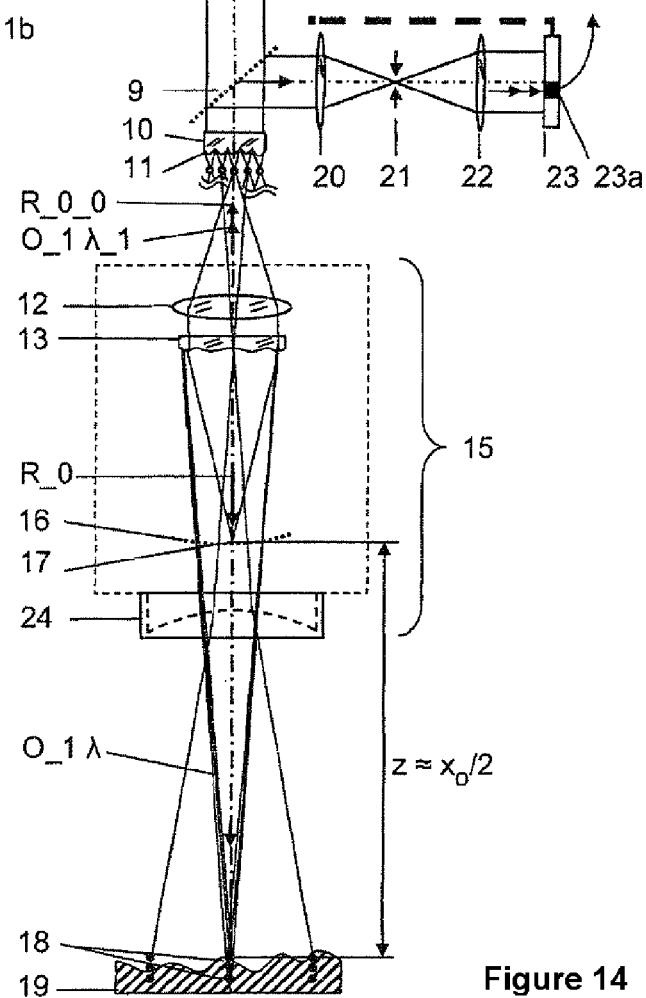
FIG. 14 shows an optical arrangement with chromatic characteristics in the object beam path and achromatic characteristics for the reference beam path.

FIG. 14 shows an optical arrangement with chromatic characteristics in the object beam path and achromatic characteristics for the reference beam path. In this case, use is intended for macroscopic objects 19 at a distance of about one meter from the optical measurement system. A tunable frequency comb laser 1b with a delay length of Y is provided. The delay length Y is varied in a manner which can be defined in the resonator of the frequency comb laser 1b through +/−$\Delta Y$ by means of driver modules in the electronic system 26. The frequency comb laser 1b is followed by an optical isolator, which is not illustrated here. The light from this frequency comb laser 1b is injected by means of focusing optics 2 into a single-mode fiber 3, emerges from this again at the outlet 4 of the single-mode fiber 3, and is collimated by an objective lens 5. The light passes through a beam splitter 9 and arrives at a microlens array 10 with microlenses 11. Foci are formed. These are imaged at infinity by the objective lens 12. On the focal plane of the objective lens 12, the light passes through a diffractive zone lens 13 with a light-scattering effect, in the form of a phase grating. Zero-order beams are produced here and act as reference beams $R\_0$, and first order beams $O\text{-}1\lambda$ are produced, with these beams representing chromatically depth-split, discretized object beams. A light-refracting surface 16 is located in the optical system 15, with this light-refracting surface 16 at the same time also representing the reference surface in the two-beam interferometer. The objective lens 12, the diffractive zone lens 13, a scattering objective lens 24 and the light-refracting surface 16 together form a chromatic imaging system 15. The scattering objective lens 24, which is in the form of a dispersion-free mirror objective lens, is used to optically scan the object 19 at a distance of about one meter. The reference beams $R\_0$, which are created in the zero diffraction order downstream from the diffracting zone lens 13, are focused sharply on the light-diffracting surface 16 thus resulting in a relatively small field of foci there. A beam-splitter layer 17 with a comparatively low reflection level is located on the light-refracting surface 16. The scattering objective lens 24 is therefore used to increase the distance of the focus chain 18 produced by chromatic splitting and for measurement of a macroscopic field. FIG. 15 illustrates the intensity wavelet which results on the pixel 23a of the CCD camera 23 during a Y scan of the tunable frequency comb laser 1b. When an object element is present in the depth measurement range this intensity wavelet can be used to determine the maximum of the envelope in each case by means of suitable and known evaluation algorithms, using a computer, in order to calculate the depth position of each object element which can be detected on the object 19.

FIG. 16 shows an apparatus or arrangement which is particularly suitable for microscopic or mesoscopic application, having a tunable frequency comb laser 1b with a delay length with a mean value of Y, variable through +/−$\Delta Y$ in the resonator. The tunable frequency comb laser 1b is tuned in a long scan. The profile over time is illustrated in FIG. 17. The light from this frequency comb laser 1b is in FIG. 16 injected into a single-mode fiber 3 by means of focusing optics 2, emerges from the single-mode fiber 3 again at its outlet 4, and is collimated by an objective lens 5. The light passes through a beam splitter 9 and arrives at a pinhole array 110 with pinholes 111. These pinholes 111 are imaged at infinity by the objective lens 12. On the focal plane of the objective lens 12, the light passes through a diffractive zone lens 13 with a light-scattering effect, which is in the form of a phase grating. Zero-order beams are produced here and act as reference beams $R\_0$, and first-order beams $O\_1\lambda$ are produced, with these beams representing chromatically depth-split, discretized object beams. The objective lens 12, the diffractive zone lens 13 and the objective lens 14a for focusing together form a chromatic imaging system 15. The reference beams $R\_0$ which are created in the zero diffraction order after the diffractive zone lens 13 are focused sharply on the light-refracting surface 16a on the plane-parallel plates 116 by means of the objective lens 14a, thus resulting in a very small field of foci there.

In this case, this light-reflecting surface 16 at the same time also represents the reference surface in the two-beam interferometer, in this case a Fizeau interferometer. There is a beam-splitter layer 17 with a comparatively low reflection level on the light-refracting surface 16a of the plane-parallel plate 116. The reference beams $R\_0$ are reflected back into the sensor after being reflected on the beam-splitter layer 17. The first-order beams $O\_1\lambda$, in contrast, enter the object area, where the stationary object 19 is also located, and is met by one of the foci in the focus chain 18 precisely or at least approximately in each object element. The light from all $O\_1\lambda$ order beams that is scattered back from the surface of the object 19 passes through the plane-parallel plate 116 and is once again passed via the objective lens 14a to the diffractive zone lens 13. There, reference beams $R\_0\_0$ are now created on the diffractive structure from the reference beams $R\_0$ by light diffraction in the zero diffraction order, and the object beams $O\_1\lambda\_1$ are now produced there from the object beams $O\_1\lambda$ by light diffraction in the first diffraction order. Both the reference beams $R\_0\_0$, which are not illustrated, and the discretized object beams $O\_1\lambda\_1$ are subject to confocal discrimination at the pinhole array 110 with pinholes 111. An image is produced on a CCD camera 23 of the pinhole array 110 via the objective lenses 20, 22 and the aperture 21, in order to avoid reflections, such that in each case one reference beam occurs in each pixel of this CCD camera 23, and, when a detected object element is present, a confocally discriminated object beam also occurs there, as a result of which interference occurs between these beams. In this case, because of the confocal discrimination, only light from the object beams $O\_1\lambda\_1$ strikes the pixels of the CCD camera 23, with said light being approximately sharply focused. Therefore, object beams which were imaged at least approximately sharply on the surface of the object 19 at a wavelength $\lambda$ are in this case also imaged sharply on a pixel of this CCD camera 23 by virtue of the design of the optical arrangement. The plane-parallel plate 116 carries out a plurality of axial short scans with a sawtooth waveform by means of piezo controllers 25 during the measurement process, which short scans are synchronized in the time period of the short scan $\Delta t\_short\_Int$ with respect to the long scan of the frequency comb laser 1$b$ and with respect to reading of the CCD camera 23, such that both the delay length Y of the frequency comb laser 1$b$ and the optical path-length difference x_O in the Fizeau interferometer are in each case increased by the same amount in the time period of the short scan $\Delta t\_short\_Int$. FIG. 18 illustrates the relationship in time. The synchronization, control and electrical drive of the frequency comb laser 1$b$, piezo controller 25$a$ and CCD camera 23 are provided via the electronic modules, which are not illustrated here, of the electronic system 26 for system control, which also contains a computer which also evaluates the camera signals. The amount of enlargement in this case corresponds to the centroid wavelength $\lambda\_S$. The variation of the phase angle in the time period of the short scan $\Delta t\_short\_Int$ is therefore at least approximately zero, and an image is recorded by means of the CCD camera 23 during this time period $\Delta t\_short\_Int$. After rapid resetting of the plane-parallel plate 116 by means of the piezo controller, another short scan is carried out, synchronized to the long scan, and another image is recorded, with the interference phase in each pixel of the CCD camera 23 being varied with respect to the previous short scan at least approximately through 756 degrees in the subsequent scan, since the optical path-length difference has changed by 2.1 centroid wavelengths $\lambda\_S$ between the two successive short scans. This scanning of the comparatively high-frequency interference wavelet, which is not illustrated here, creates a wavelet whose frequency is considerably lower than that of the interference wavelet in each pixel of the CCD camera 23, for example in the pixel 23$a$, over the time $\Delta t\_long\_fc$, as is illustrated in FIG. 19, which can therefore be scanned with a comparatively small number of images of the CCD camera 23. The short scan and long scan synchronization illustrated in FIGS. 16 to 19 also means that it is still technically worthwhile to use low-cost cameras with a video frequency, bearing in mind the measurement times which can be achieved. Using the described measurement arrangement, these cameras allow comparatively rapid and complete measurement even of objects with a comparatively large depth extent, in which case a comparatively high signal-to-noise ratio can also generally be achieved in particular because of the comparatively long integration times of the cameras with a video frequency.

FIG. 20 illustrates, in particular, one approach for measurements of microscopically small objects 19 with a comparatively large numerical aperture and therefore with a short wave-optical depth of focus. It is therefore necessary for a depth extent of the object 19 which is greater than the wave-optical focus depth to carry out a depth scan, in order to allow all of the object details to be imaged sharply once during the serial measurement process. A tunable frequency comb laser 1$b$ with a delay length with a mean value of Y=95 mm is used as a light source. The tunable frequency comb laser 1$b$ is tuned harmonically oscillating at a frequency of 100 Hertz, with the amplitude of the oscillation in this case being $\Delta Y=0.261$ $\mu$m. FIG. 21 illustrates the relationship in time. This oscillation represents a short scan. The light from the frequency comb laser 1$b$ is injected into a single-mode fiber 3 by means of focusing optics 2, emerges from this single-mode fiber 3 again at the outlet 4, is passed by means of an objective lens 124 to a rotating matt pane 105, where a field thereon is illuminated. This illuminated field is imaged by an objective lens 5 into the pupil of the mirror objective lens 127. The light is passed to a beam splitter 109, which has a beam-splitter layer 109$a$ and a beam-splitter layer 109$b$ and is part of an object-imaging two-beam interferometer. The light reflected on the beam-splitter layer 109$a$ is passed via a triple reflector 126 back to the beam splitter 109, and now passes through the beam-splitter layer 109$b$ and arrives via the objective lens 22 at the CCD camera 23. The light which passes through the beam-splitter layer 109$a$ then passes through the mirror objective 127 and arrives at the object 19, which is moved in depth during the measurement process. FIG. 22 illustrates the relationship in time. During the long scan, each object element of the object 19 is therefore imaged wave-optically sharply once on the CCD camera 23 in that, after passing through the mirror objective 127, the light scattered back is reflected on the beam-splitter layer 109$b$, and is imaged via the objective lens 22 on the CCD camera 23. This leads to interference with the light propagating in the reference beam path via the triple reflector 126 and which is passed in the form of transmission through the beam splitter 109 with the beam-splitter layer 109$b$. The CCD camera 23 records a stack of images during the measurement process, with the image recording frequency in this case being 400 Hz. The centroid wavelength is $\lambda\_S=820$ nm. The 3 dB width of the spectrum of the light used from the frequency comb laser 1$b$ is about 200 nm.

The object-imaging two-beam interferometer in FIG. 20 on average has an optical path-length difference x_O of 95 mm, which corresponds to the mean optical delay length Y of the frequency comb laser 1$b$. The object 19 is moved in depth at a rate of 172.2 $\mu$m/s during the measurement process. The integration time period of the CCD camera 23 is in this case $\Delta tD=2.5$ ms. Images are in each case recorded and are stored in an image stack by exact synchronization of the clock of the CCD camera 23 to the oscillation of the frequency comb laser 1$b$ and, for depth scanning of the object 19, by the electronic system 26 for system control. Therefore, the phase angle $\phi$ in the interference image on the CCD camera 23 is virtually unchanged in every fourth camera image, specifically if the delay length Y and the optical path-length difference x_O are each increased by at least approximately the same amount and the interference image is virtually stationary in every fourth camera image. An image is in this case stored whenever the oscillation process of the frequency comb laser 1$b$ is in the rising area Ai-2, Ai-1, Ai . . . . The change in the optical path-length difference in the object-imaging interferometer is approximately $\Delta x\_O=2.1\cdot\lambda\_S=2.1\cdot820$ nm=1722 nm from a first image to a fifth image, that is to say from the rising area Ai-2 to the rising area Ai-1. The change in the phase angle in the pixel is therefore in each case approximately 756 degrees from a first image to a fifth image—in each case in the phase of a rising area Ai-2, Ai-2, Ai. This leads to undersampling of the interference signals and in each case produces a comparatively low-frequency wavelet for each detected object point in the pixels of the CCD camera 23 during depth scanning of the object 19. FIG. 23 illustrates the voltage profile U which results in the electronic system 26 for system control of the output of the camera amplifier, for example for the pixel 23$a$, over a long scan. By way of example, the wavelet evaluation is in each case carried out by means of centroid determination and determination of the modulation maximum, and therefore leads to the depth position z of each detected object element of the object 19.

The triple reflector 126 and the objective lens 127 are each in the form of mirror systems. The dispersion in the beam-splitter plate 109, which is in the form of a high-precision plane-parallel plate, is the same in both of the arms of the object-imaging interferometer, thus resulting in virtually complete compensation for the dispersion in the object-imaging interferometer, with no disturbing chirp effect advantageously occurring in the interference signal. A further advantage of this arrangement is that no mechanical oscillations can occur as a result of short scans in the object-imaging interferometer, since these take place in the frequency comb laser 1b, which is arranged physically remotely from the object-imaging interferometer.

Figures 24, 25, 26:
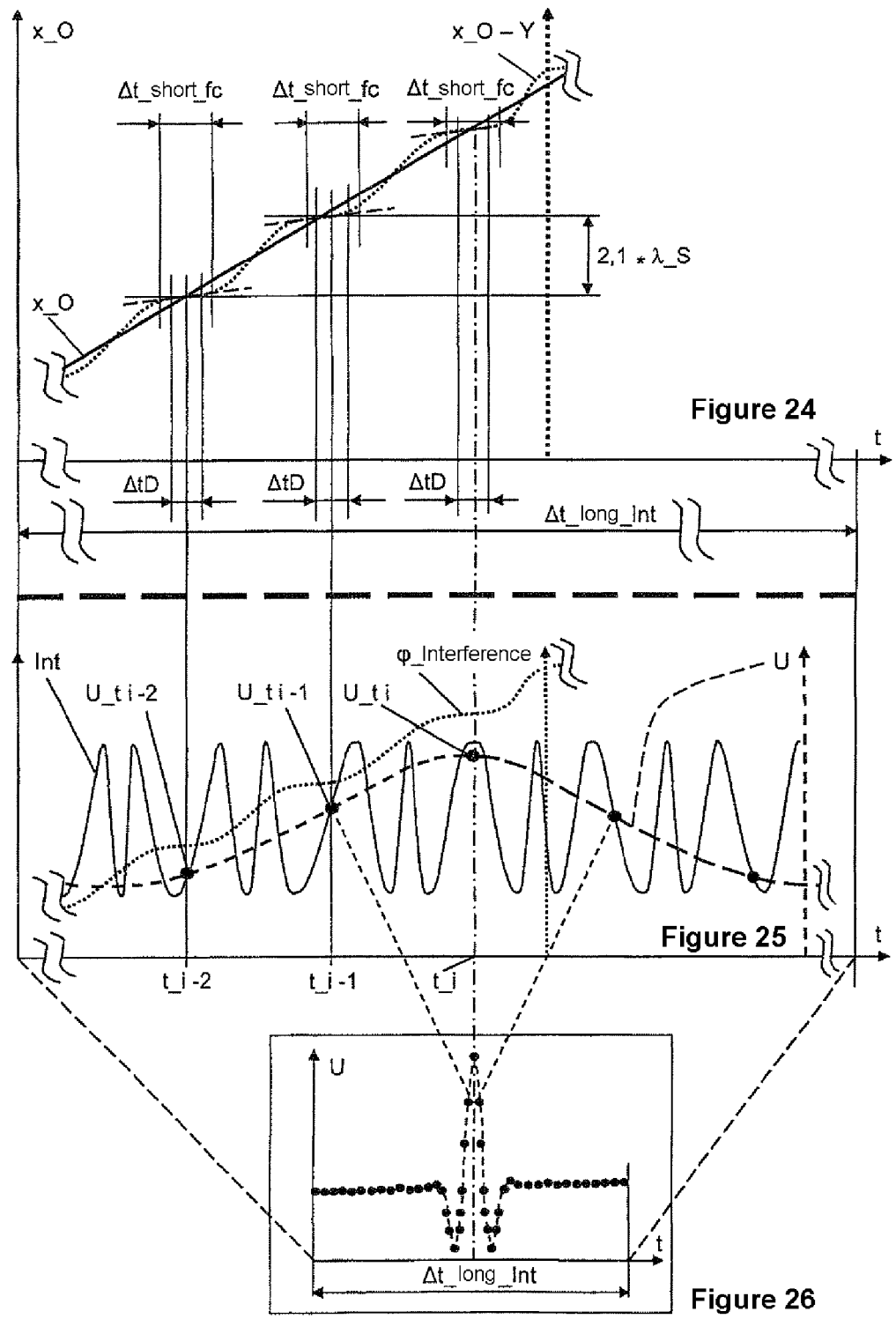
FIG. 24 illustrates an enlargement of the optical path-length difference over the time of time interferometer long scan when the object is moved at a constant rate in depth during a long scan.
FIG. 25 illustrates voltage values obtained at the output of the camera amplifier of the CCD camera for a part of the signal.
FIG. 26 illustrates the complete voltage signal that results over time in the interferometer long scan detected by the pixel.

FIG. 24 illustrates an enlargement of the optical path-length difference x_O over the time of an interferometer long scan when—as illustrated in FIG. 22—the object 19 in FIG. 20 is moved at a constant rate in depth during a long scan. The dotted line in FIG. 23 also shows the difference between the optical path-length difference x_O and the delay length Y of the frequency comb laser 1b plotted against time. A plurality of short scans are embedded in time in one interferometer long scan. The increase in this difference, that is to say x_O-Y, is considerably reduced in the time of each short scan Δt_short_fc, and the CCD camera 23 is in each case read with the integration time period ΔtD in these times of short scans. Here, the increase in the optical path-length difference from one short scan to another is 2.1 centroid wavelengths λ_S. In addition, the phase angle φ_interference is modulated corresponding to the current difference between the optical path-length difference x_O and the delay length Y. This results in a variable change in the phase angle rate dφ/dt over time. At the minima of the phase angle rate, where the intensity in the interference image changes only comparatively slowly, or not at all, the intensity is detected at each of the times t_i-2, t_i-1, t_i, in each case with the integration time duration ΔtD, by means of the CCD camera 23. These voltage values U_t i-2, U_t i-1 and U_t i obtained in this way at the output of the camera amplifier of the CCD camera 23 therefore lie on a long-period wavelet. FIG. 25 illustrates this for a part of the signal U, which is obtained by means of pixel 23a. The complete voltage signal U which results over the time t in the interferometer long scan, detected by the pixel 23a, is shown in FIG. 26.

The invention claimed is:

1. A method for interferometry comprising:
producing an electromagnetic measurement signal;
splitting the measurement signal into a scanning beam component and a reference beam component;
illuminating at least one object point with at least a portion of the scanning beam component;
producing an interference signal by superimposition of a component of the scanning beam component that has been reflected from the at least one object point with the reference beam component, wherein that portion of the scanning beam component in the interference signal which has been reflected from the at least one object point has an optical path-length difference x_O, which depends on the position of the object point, relative to the reference beam component,
wherein the measurement signal is produced with a frequency comb spectrum with the same frequency comb intervals Δf_Signal of the individual frequency components, and/or wherein the interference signal is filtered by means of a frequency comb filter such that the filtered interference signal now has only a frequency comb spectrum with the same frequency comb intervals Δf_Signal of the individual frequency components; and wherein the method furthermore comprises:
carrying out a first scanning process such that the optical path-length difference x_O or the frequency comb intervals Δf_Signal in the frequency comb spectrum is varied continuously;
carrying out a second scanning process repeatedly during the first scanning process, such that the frequency comb interval Δf_Signal or the optical path-length difference x_O is varied continuously so that a change in the frequency comb interval Δf_Signal or the continuous change in the quotient c/x_O of the speed of light c and the optical path-length difference x_O resulting from the continuous variation of the path-length difference x_O corresponds in its mathematical sign at least at times to the continuous change of the frequency comb intervals Δf_Signal caused by the first scanning process and such that the frequency comb intervals Δf_Signal corresponds at least at times to an integer multiple of the quotient c/x_O; and
detecting an intensity and/or of an intensity change in the interference signal for a multiplicity of frequency comb intervals Δf_Signal and/or for a multiplicity of optical path-length differences x_O.

2. The method of claim 1, wherein a section of a position-resolving detector, in particular of a detector array, having a multiplicity of optical detector elements is used as an optical detector element.

3. The method of claim 1, wherein the production of the electromagnetic measurement signal comprises:
producing an electromagnetic output signal with a continuous spectrum; and
filtering of the output signal by means of a tunable multi-beam interferometer in order to produce the electromagnetic measurement signal with a frequency comb spectrum such that the frequency comb intervals Δf_Signal of the measurement signal are varied over time in a modulation interval ([Δf_Signal_min;Δf_Signal_max]) of the frequency comb intervals.

4. The method of claim 1, furthermore comprising determination of a frequency comb modulation interval Δf_Source_Mod from detected values of the intensity and/or intensity changes of the interference signal, wherein the frequency comb modulation interval Δf_Source_Mod is determined
as the frequency comb interval Δf_Signal for a maximum modulation of a detected signal profile of the interference signal; and/or
as the frequency comb interval Δf_Signal for a signal maximum in the detected signal profile of the interference signal, and/or;
as the frequency comb interval Δf_Signal at a signal centroid of the detected signal profile of the interference signal.

5. The method of claim 4, furthermore comprising determining a value of the optical path-length difference x_O from the frequency comb modulation interval Δf_Source_Mod using x_O=c/Δf_Source_Mod with the speed of light c.

6. The method of claim 1, which comprises:
wherein the step of carrying out a first scanning process comprises continuously varying the frequency comb intervals Δf_Signal in the frequency comb spectrum, the optical path-length difference x_O or an optical delay length or path length Y of a signal path in a measurement signal source; and
wherein the step of carrying out a second scanning process comprises repeatedly varying, during the first scanning process, the optical path-length difference x_O, the frequency comb interval Δf_Signal or the optical delay length or path length Y of the signal path in the measurement signal source so that the change in the optical delay length resulting from the second scanning process is opposite a mathematical sign after the change in the optical delay length resulting from the first scanning process, wherein an intensity and/or an intensity change of the interference signal are/is detected during the second scanning process.

7. The method of claim 6, wherein an intensity and/or intensity change is detected during a detector integration time period $\Delta tD$, during which a magnitude of a phase in the interference signal changes through no more than 180 degrees.

8. The method of claim 7, wherein the second scanning process is in the form of a harmonic oscillation of the optical delay length Y in the measurement signal source over time, and wherein an intensity and/or intensity change of the interference signal is detected in a time period which includes the harmonic oscillation passing through a point of inflection of a spatial oscillation movement at which the change in the optical delay length Y resulting from the second scanning process is opposite a mathematical sign after the change in the optical delay length Y resulting from the first scanning process.

9. The method of claim 6, wherein the second scanning process has a sawtooth profile of the optical path-length difference x_O or of the reciprocal $1/\Delta f\_Signal$ of the frequency comb intervals $\Delta f\_Signal$ or of the optical delay length Y in the measurement signal source over time, and wherein an intensity and/or intensity change of the interference signal is detected during along flank of the sawtooth profile.

10. The method of claim 6, wherein the second scanning process is in the form of a harmonic oscillation of the optical path-length difference x_O or of the reciprocal $1/\Delta f\_Signal$ of the frequency comb intervals $\Delta f\_Signal$ over time, and wherein an intensity and/or intensity change of the interference signal is detected in a time period which includes the harmonic oscillation passing through a point of inflection of a spatial oscillation movement at which the change in the frequency comb intervals $\Delta f\_Signal$ corresponds to a mathematical sign after the change of the quotient c/x_O.

11. An apparatus for interferometry comprising:
a measurement signal source for production of an electromagnetic measurement signal;
an interferometer arrangement which is designed
    to split the measurement signal into a scanning beam component and a reference beam component;
    to illuminate at least one object point with at least one portion of the scanning beam component; and
    to produce an interference signal by superimposition of a component of the scanning beam component which has been reflected from the at least one object point with the reference beam component, wherein that portion of the scanning beam component in the interference signal which has been reflected from the at least one object point has an optical path-length difference x_O, which depends on the position of the object point, relative to the reference beam component;
wherein the measurement signal source is designed to produce the measurement signal with a frequency comb spectrum with the same frequency comb intervals $\Delta f\_Signal$ of the individual frequency components, and/or wherein the apparatus also comprises a frequency comb filter which is designed to filter the interference signal such that the filtered interference signal now has only a frequency comb spectrum with the same frequency comb intervals $\Delta f\_Signal$ of the individual frequency components; and wherein the apparatus also comprises:
    a control device for varying the frequency comb intervals $\Delta f\_Signal$ in the frequency comb spectrum and/or for varying the optical path-length difference x_O over time such that the frequency comb intervals $\Delta f\_Signal$ correspond to an integer multiple of the quotient c/x_O of the speed of light c and the optical path-length difference x_O, wherein the control device is designed to control a first and a second scanning process synchronously such that in the first scanning process, the frequency comb intervals $\Delta f\_Signal$ are varied continuously, and in the second scanning process, which is carried out repeatedly during the first scanning process, the optical path-length difference x_O or the frequency comb intervals $\Delta f\_Signal$ is varied continuously such that a continuous change in the quotient c/x_O or the change in the frequency comb interval $\Delta f\_Signal$ corresponds to a mathematical sign after the continuous change in the frequency comb intervals $\Delta f\_Signal$ or the quotient c/x_O which occurred in the first scanning process; and
    at least one detector element for detection of an intensity and/or intensity change in the interference signal for a multiplicity of frequency comb intervals $\Delta f\_Signal$ and/or for a multiplicity of optical path-length differences x_O,
wherein the control device is also designed to control the at least one detector element such that an intensity and/or an intensity change of the interference signal are detected during the second scanning process.

12. The apparatus of claim 11, wherein the interferometer arrangement comprises a Fizeau interferometer, a Michelson interferometer, a Twyman-Green interferometer, a Mirau interferometer, a Linnik interferometer or a Mach-Zehnder interferometer.

13. The apparatus of claim 11, wherein the measurement signal source comprises a tunable frequency comb laser.

14. The apparatus as claimed in claim 11, wherein the measurement signal source comprises:
a radiation source for production of an electromagnetic output signal with a continuous spectrum; and
a frequency comb filter for filtering the output signal in order to produce the electromagnetic measurement signal with a frequency comb spectrum such that the frequency comb intervals $\Delta f\_Signal$ of the measurement signal can be varied over time in a modulation interval ($[\Delta f\_Signal\_min; \Delta f\_Signal\_max]$) of the frequency comb intervals.

15. The apparatus as claimed in claim 11, comprising an optical waveguide for transmission of the measurement signal from the measurement signal source to the interferometer arrangement.

16. The apparatus of claim 11, wherein the measurement signal source comprises:
a first signal scanning device for carrying out a first scanning process such that an optical delay length or path length Y of a signal path in the measurement signal source is varied continuously; and
a second signal scanning device for carrying out a second scanning process, which is carried out repeatedly during the first scanning process, such that the optical delay length or path length Y of the signal path in the measurement signal source is in this case varied continuously such that the change in the optical delay length resulting from the second signal scanning process is opposite a mathematical sign after the change in the optical delay length resulting from the first signal scanning process,
and wherein the control device is designed to control the at least one detector element such that an intensity and/or intensity change of the interference signal are/is detected during the second scanning process.

* * * * *